United States Patent [19]
Matsumoto et al.

[11] Patent Number: 5,305,230
[45] Date of Patent: Apr. 19, 1994

[54] PROCESS CONTROL SYSTEM AND POWER PLANT PROCESS CONTROL SYSTEM

[75] Inventors: Hiroshi Matsumoto, Ibaraki; Makoto Shimoda, Katsuta; Masahide Nomura, Hitachi; Tadayoshi Saito, Hitachiota; Hiroshi Yokoyama; Akira Kaji, both of Hitachi; Hisanori Miyagaki, Hitachiota; Seiitsu Nigawara, Hitachi; Hiroshi Hanaoka, Mito, all of Japan

[73] Assignee: Hitachi, Ltd., Chiyoda, Japan

[21] Appl. No.: 615,868

[22] Filed: Nov. 20, 1990

[30] Foreign Application Priority Data

Nov. 22, 1989 [JP] Japan ............................. 1-302171

[51] Int. Cl.⁵ ............................................. G06F 15/46
[52] U.S. Cl. ................................. 364/495; 364/149; 395/906; 395/914
[58] Field of Search ............... 364/148, 149, 150, 151, 364/494, 495; 395/907, 906, 910, 11

[56] References Cited

U.S. PATENT DOCUMENTS

| | | | |
|---|---|---|---|
| 4,607,325 | 8/1986 | Horn | 364/495 X |
| 4,628,462 | 12/1986 | Putman | 364/494 |
| 4,805,114 | 2/1989 | Putman et al. | 364/494 |
| 4,858,147 | 8/1989 | Conwell | 364/148 X |
| 4,864,490 | 9/1989 | Nomoto et al. | 395/11 X |
| 4,868,754 | 9/1989 | Matsumoto | 364/150 X |
| 4,975,827 | 12/1990 | Yonezawa | 364/148 X |
| 5,046,019 | 9/1991 | Basehore | 395/11 X |
| 5,051,932 | 9/1991 | Inoue et al. | 395/11 X |
| 5,142,612 | 8/1992 | Skeirik | 395/11 |
| 5,175,797 | 12/1992 | Funabashi et al. | 395/11 X |
| 5,179,624 | 1/1993 | Amano et al. | 395/11 X |

OTHER PUBLICATIONS

JP-B-63-33164.
JP-A-63-94004.
Electrical World Feb. 7, 1966 pp. 58-62.
IEEE Transactions on Power Apparatus and Systems, Apr. 1985 pp. 821-828.
IEEE Transactions on Power Apparatus and Systems, Aug. 1982 pp. 2504-2512.
The MIT Press, D. E. Rumelhart, G. E. Hinton, and R. J. Williams 1986 pp. 675-695.

*Primary Examiner*—Kevin J. Teska
*Attorney, Agent, or Firm*—Antonelli, Terry, Stout & Kraus

[57] ABSTRACT

A process control system controls a large scale plant such as thermal power plant. This process control system includes a target setting unit for setting an operation target, a control unit for receiving a signal indicating the operation target and for outputting a controlled variable to operate the process, an evaluation unit for quantitatively evaluating operation characteristics corresponding to the operation target of the process operated on the basis of a signal indicating the controlled variable supplied from the control unit, a modification unit for extracting an optimum operation process qualitatively squaring or conforming with the evaluated value derived by the evaluation unit out of a modification rule predetermining operation unit in qualitative relation between the operation characteristics and the operation target of the process and for determining the modification rate of the control unit, a storage unit having a model of a neural network for storing a relation between the operation target and the modification rate derived by the modification unit as a connection state within a circuit, and a learning unit for making the model of the neural network learn the relation between the operation target and the modification rate.

22 Claims, 18 Drawing Sheets

F I G. 24
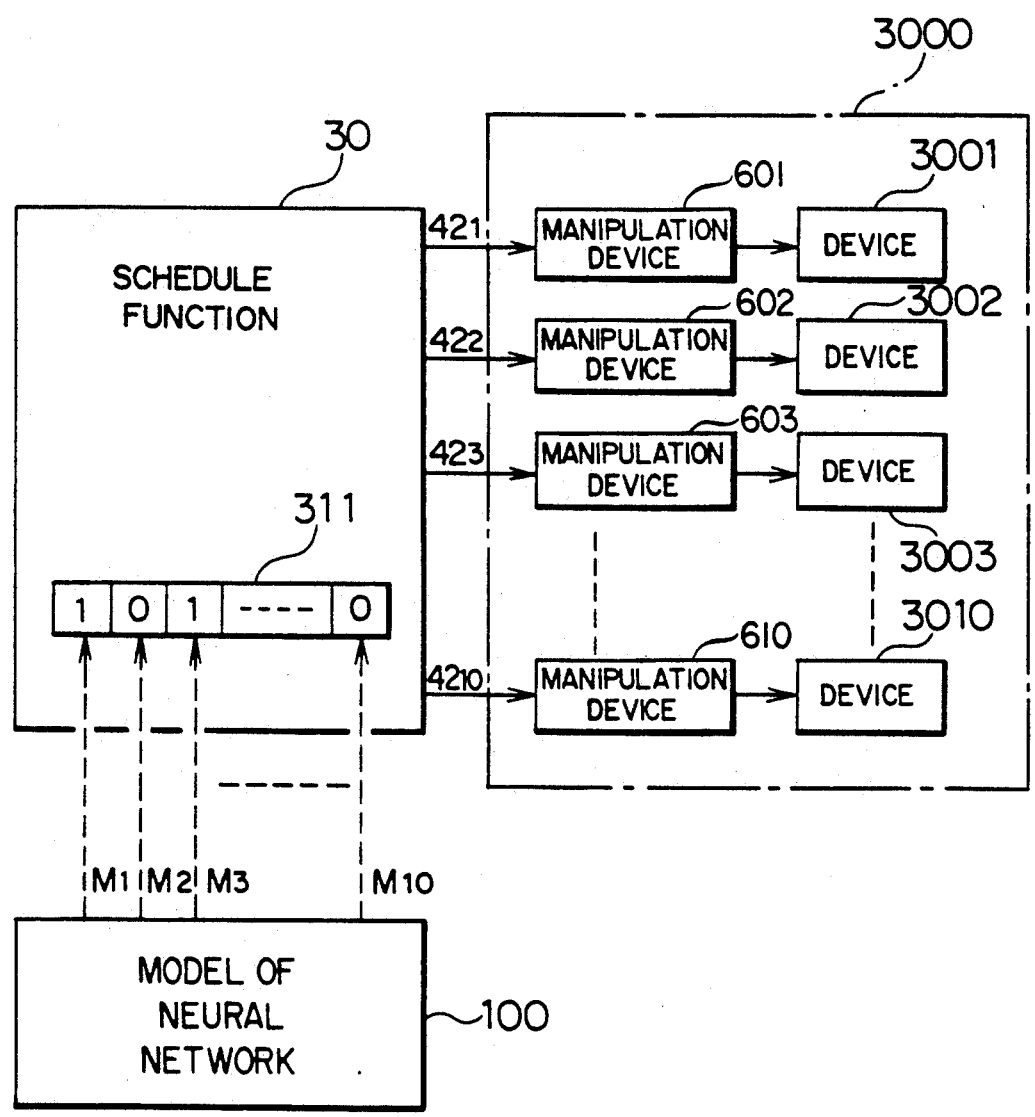

PROCESS CONTROL SYSTEM AND POWER PLANT PROCESS CONTROL SYSTEM

BACKGROUND OF THE INVENTION

The present invention relates to a plant process control system, and in particular to a process control system suitable for a large-scale plant such as a thermal power plant. A control system according to the present invention is a multi-purpose adaptive control system in which an objective function such as time required for startup or life consumption set by an operator in consideration of situation can be optimized by means of self-learning.

In a large-scale complicated process such as a thermal power plant process, a process variable such as turbine main steam temperature or main steam pressure has strong nonlinearity with respect to the manipulation rate of a manipulating parameter for controlling the process variable so that it may become a desired value. In conventional systems, therefore, the whole-system model of the process is incorporated in the control system and it is attempted to optimize the manipulation rate of the manipulating parameter by using the whole-system model of the process and operations research as described in JP-B-63-33164. That is to say, nonlinearity is represented by a model as table information or represented by physical expressions, and the optimum value of the manipulation rate of the manipulating parameter is derived by using nonlinear programming represented by the complex method.

In a conventional control system with a built-in model, the control performance of the actual plant is directly affected by the precision of the model, and hence a question arises as to how to study the significance of the model.

SUMMARY OF THE INVENTION

An object of the present invention is to provide a process control system in which it is possible to attempt to automatically optimize the process by using a simple knowledge base without using a whole-system model of the process.

Another object of the present invention is to provide a power plant process control system attaining the above described object.

The process control system of the present invention comprises following necessary components ① to ③:

① an operation target setting section for setting the operation target of the process to be controlled;

② a control section for receiving a signal supplied from the operation target setting section and outputting a controlled variable to operate the above described process; and ③ a optimization section for optimizing the controlled variable of the above described control section in accordance with operation characteristics corresponding to the above described operation target of the process which is operated on the basis of a signal supplied from the control section The above described optimization section comprises following necessary components to ④ to ⑦:

④ an evaluation unit for quantitatively evaluating operation characteristics corresponding to the above described operation target of that process operated on the basis of the signal supplied from the above described control section;

⑤ modification rule (knowledge base) predetermining operation means in qualitative relation between the operation characteristics and the operation target of that process;

⑥ a modification unit for extracting operation means, which qualitatively squares or conforms with the evaluation value derived by the evaluation unit, out of the modification rule and determining the modification rate of the control section; and ⑦ a storage unit for storing the relation between the modification rate obtained by the modification unit and the above described operation target.

It is desirable that the above described control section should comprise a basic operation schedule production unit for producing an operation schedule for the process to be controlled to achieve the operation target given by the target setting section, and a regulating unit for receiving a signal from a storage unit storing the relation between the modification rate of the operation schedule and the operation target based upon the past operation characteristics and for modifying the basic operation schedule.

It is desirable that the storage unit should have a model of a neural network for storing the relation between the above described operation target and the above described modification rate as an intercircuit connection state.

Further, it is desirable that the model of the neural network should be that of backpropagation type having a layer network comprising an input layer, a hidden layer and an output layer.

It is desirable that the above described modification unit should have a function of extracting operation means, which qualitatively squares or conforms with the evaluation value derived by the above described evaluation unit, out of the above described modification rule and converting the operation means into quantitative operation means in accordance with fuzzy logic.

It is desirable that the above described modification rule comprises at least two items, i.e., condition part (if part) and conclusion part (then part).

The basic operation schedule itself may be modified on the basis of a signal supplied from the storage unit. Alternatively, the manipulation rate for executing the basic operation schedule or the manipulation rate of the manipulating parameter may be modified without modifying the basic operation schedule.

In a power plant comprising a boiler for generating steam generated by combustion of fuel, a steam turbine for converting heat energy of steam thus generated into mechanical energy, and a generator for generating the resultant mechanical energy into electrical energy, the power plant process control system comprises following necessary components (1) to (7).

(1) Operation target setting section

This section sets the operation target of the process. For example, concrete operation targets comprises time required for target attainment, time required for startup, energy consumption, machine life consumption, precision of target attainment, resource consumption, operational constraint and allowable life consumption.

(2) Control section

This section receives the operation target and outputs the necessary controlled variable to the process.

It is desirable that the control section should have basic operation schedule producing function and regulating function. It is desirable that the basic operation schedule producing fucntion should produce a time schedule for the process to achieve the operation target. The regulating function is provided with the basic operation schedule and an addition schedule of the schedule modification rate. It is desirable that the manipulation rate for controlling the process or the manipulation rate of the manipulating parameter should be modified by the regulating function. The manipulation rates are the rate of fuel feed to the boiler, rate of air flow, rate of water feed, and control valve opening of the turbine, for example.

It is desirable that the basic operation schedule should be produced in consideration of the initial value of the process variable.

In case the feedback control scheme is used as the regulating function, it is desirable that the process variable should be used as input information.

(3) Optimization section

This section optimizes the controlled variable of the control section in accordance with the operation characteristics of the process. It is desirable that the optimization section should have the evaluation function, modification function, modification rule and storage function. It is further desirable that learning function should be added.

(4) Evaluation function

With respect to the operation target, actual operation characteristics are quantitatively evaluated. It is desirable that response characteristics of the process variable should be evaluated and the result should be adopted as the evaluated value used in fuzzy reasoning. The process variable refers to the turbine speed, main steam temperature, main steam pressure, reheat steam temperature or reheat steam temeprature in a power plant, for example.

(5) Modification function

On the basis of the quantitative evaluated value derived by evaluation means, it refers to a modification rule (knowledge base) produced beforehand, extracts operation means qualitatively squaring or conforming with the evaluated value, and determines the modification rate of the control unit. It is desirable that fuzzy reasoning function should be provided.

(6) Modification rule (knowledge base)

It is a rule determining operation means in qualitative relation with respect to operation characteristics corresponding to the operation target. It is desirable that a set of fragmentary knowledge obtained by representing qualitative knowledge, which is possessed by experts with respect to the modification method of a schedule corresponding to the evaluated value of the evaluation unit, so that the qualitative knowledge may be processed by a computer should be defined as the modification rule.

It is desirable that the modification rule has at least two items, i.e., condition part (if part) and conclusion part (then part).

(7) Storage function

Relations between the operation target and the modification rate are stored. It is desirable that a model of neural network for storing those relations as intracircuit connection state should be provided. In response to the operation target supplied from the target setting function, the model of neural network outputs the modification rate of the control function.

It is desirable that the storage function has a model of neural network of backpropagation type having a layer network comprising an input layer, a hidden layer and an output layer.

(8) Learning function

The model of neural network is made to learn the relations between the operation target and the modification rate. The strength of connectivity (synapse weight) of the input section to each unit of the hidden layer and the output layer is determined so that the output signal pattern may become a predetermined signal pattern when an input signal pattern is supplied to the input layer.

The present invention allows self-enhancing improvement of operation characteristics based upon data of actual operation results without explicit possession of the process model.

Further, it is possible to realize optimization function which can determine operation means whereby the process can always perform optimum operation with respect to the operation target changing every day and every moment.

Further, with respect to a plurality of control targets, an operator can change weight values of necessary targets in consideration of the situation and determine such operation means as to satisfy a plurality of control targets thus changed. Herein, a plurality of control targets relate to the operational constraint, time required for target attainment, allowable life consumption, allowable consumption, and so on.

The above described "operation means" mean the time schedule of the set point, proportional plus integral plus derivative (PID) control gain, gain, function, parameters for switching devices or the like, and so on.

As the prior art with respect to the present invention, there is a method of performing optimization by using linear programming on the basis of the model alternation type in which a plurality of models prepared are switched to be used according to the operation area of the process or the periodical model identification type.

In these cases as well, model construction is necessary, and a question arises as to how to raise the model significance.

In these conventional techniques, improvement of control characteristics by means of alternation of manipulating parameter according to the situation is not automated either. Further, the control system does not self-enhance as actual operation results are accumulated. In the absence of personal intervention, the control characteristics often degenerate and never become better.

In an example of the control system of the present invention, the control system has built-in self-learning mechanism centering around fuzzy reasoning and a model of neural network. The fuzzy reasoning determines operation means for improving the operation characteristics by evaluating data of actual operation results. The model of neural network successively learns the operation means. As a result, it is possible to attempt to optimize the operation means on the basis of data of actual operation results without provision of the process model.

Further, in an example of the control system of the present invention, optimum operation means making the most of the fruit of past learning can be obtained by supplying the operation target changing every day and every moment to the above described model of neural network. As a result, it becomes possible to output necessary operation means from the model of neural network in a moment.

Further, the present invention allows an operator to arbitrarily set weights concerning a plurality of operation targets and execute optimization with respect to this. By inputting the weights concerning various operation targets set in the control system, it is possible to take out in a moment operation means which becomes synthetically optimum on the basis of operation means learned in the past. As for operation characteristics at this time as well, it is possible to evaluate it by means of fuzzy reasoning, determine operation means which becomes synthetically optimum, and make the above described model of neural network learn that operation means.

In accordance with the present invention, the operation target of the process and its actual operation characteristics are evaluated, and the controlled variable of process operation is determined by referring to a modification rule drawn up beforehand.

The relation between this modification rate and the operation target is stored into the storage unit. When an operation target is inputted to the storage unit, a modification rate corresponding thereto is immediately conveyed to the control unit, and the process is operated on the basis of it. If the necessity of modification becomes necessary here again, the modification rate is determined again with reference to the modification rule and its result is stored in the relation to the operation target and immediately conveyed to the control unit to attain optimization.

In a preferred example of the present invention, fuzzy reasoning having reasoning capability based upon qualitative knowledge built in the control system and the model of neural network having case learning capability contribute to self-learning as principal functions.

In the fuzzy reasoning, operation means for improvement is determined while data of actual operation results obtained by operation of the process is being evaluated by using the knowledge base storing beforehand qualitative knowledge of experts such as operators, regulators and control technicians concerning operation characteristics and means for improving the operation characteristics.

On the other hand, in the model of neural network, the mutual relation between the operation target given at this time and the operation means determined by the above described fuzzy reasoning is learned.

The term "learning" in this case means determining the circuit connection state within the model so as to output the above described operation means when the operation target is inputted to the model of neural network. In case there are data of actual operation results and a plurality of sets of data concerning operation means at that time, therefore, all relations can be learned by successively and repetitively teaching them to the model of neural network.

By adding such self-learning mechanism, operation characteristics of the control system become better as actual operation results are accumulated.

Optimization mechanism, which is a means for allowing determination of the operation means whereby the process can always perform optimally with respect to the operation target changing every day and every moment, acts as hereafter described. That is to say, when the operation target, changing every day and every moment, is set in the input section of the above described model of neural network which has already learned operation means as the internal connection state, operation means which is the most suitable for attaining that operation target is outputted from output section of the model of neural network. If the model of neural network is made to sufficiently learn past operation cases, optimum operation of the process with respect to the operation target changing every day and every moment is assured.

Such optimization mechanism that an operator can change weight values of necessary targets according to the situation and a plurality of control targets thus changed are satisfied acts as follows. That is to say, operation means capable of synthetically optimizing a plurality of given operation targets is derived out of operation means learned by the model of neural network as its connection state. In operating the process, the operator need only set weights for various operation targets into the control system in accordance with situation change of every day and every moment. Thereby necessary operation characteristics are obtained. Here, operation targets relate to time required for startup, energy consumption, machine life consumption, time required for target attainment, attainment accuracy of target state, attainment accuracy of state transition rate, resource consumption, margin against operational constraint, and so on. If a plurality of weighted operation targets thus set are supplied to the input section of the model of neural network, the optimum operation means is outputted from the output section of the model of neural network on the basis of the result of learning and the process is operated in accordance with the optimum operation means thus outputted. Further, operation characteristics at this time are also evaluated by fuzzy reasoning, and operation means synthetically squaring with the operation target is determined while the knowledge base is being referred to. The model of neural network learns the operation means thus determined. By repeating this, operation characteristics become better for multipurpose operation as well.

BRIEF DESCRIPTION OF THE DRAWINGS

FIG. 24 is a schematic configuration diagram showing the case where the present invention is applied to optimum selection of a device required for operation out of devices.

DESCRIPTION OF THE PREFERRED EMBODIMENT

An embodiment of a process control system according to the present invention will hereafter be described.

Figure 1:
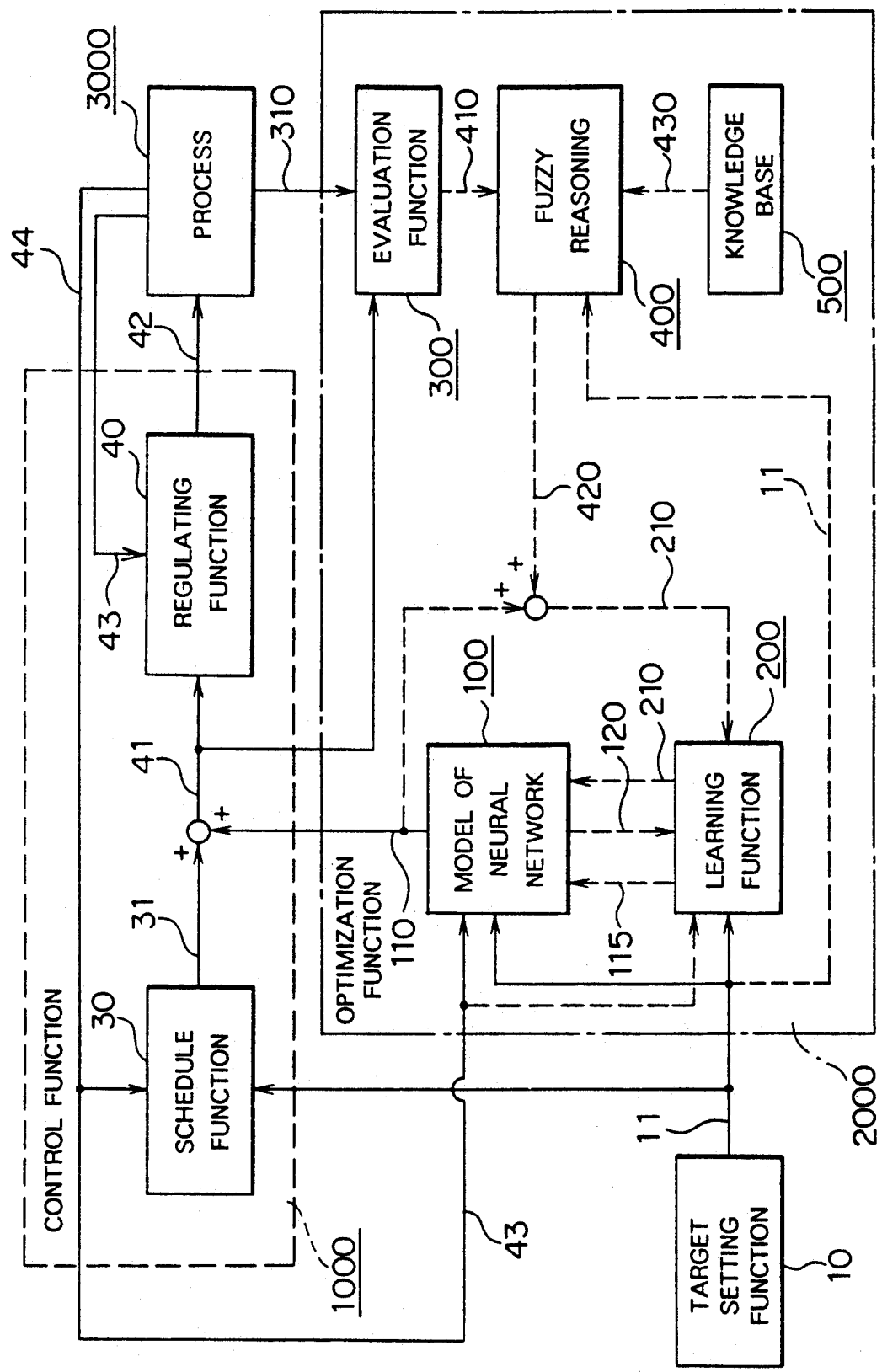
FIG. 1 shown an embodiment of a plant control system of the present invention and is a configuration diagram showing the function activated in the operation mode, i.e., in the actual operation of the process.

FIG. 1 shows an example of a process control system according to the present invention. The present system comprises a target setting function 10, an optimization function 2000, a control function 1000, and a process 3000 to be controlled.

The target setting function 10 is a function for setting an operation target 11 of a process and it is provided for setting an operation target supplied from the outside of the present control system such as an operator or another control system into the control function 1000 and the optimization function 2000.

The control function 1000 is provided to receive the above described operation target 11 and output a necessary manipulating value 42 to the process 3000.

Further, the optimization function 2000 is provided to optimize the controlled variable of the control function 1000 in accordance with operation characteristics (response characteristics) 310 of the process 3000.

Concrete function configuration will hereafter be described.

The control function 1000 comprises a schedule function 30 and a regulating function 40. The schedule function 30 produces a temporal target value, i.e., a time schedule (referred to as basic schedule 31) so that the process may achieve the operation target 11 supplied from the target setting function 10. Further, the sum of the basic schedule 31 and a first schedule modification rate 110 which will be described later is supplied to the regulating function 40 as a set point 41.

The regulating function 40 determines the manipulating value 42 and manipulates the process 3000 so that a process variable 43 of the process 3000 to be controlled may follow the set point 41.

The optimization function 2000 comprises an evaluation function 300, fuzzy reasoning 400, a knowledge base 500, a learning function 200 and a model 100 of neural network. In response to the operation target 11 supplied from the target setting function 10, the model 100 of neural network determines the modification rate of the above described basic schedule 31 (referred to as first schedule modification rate). Thereby optimization of the set point 41 supplied to the regulating function 40 is attempted.

The evaluation function 300 evaluates the response characteristics 310 of the process 3000 and delivers the evaluated value 410 to the fuzzy reasoning 400.

The knowledge base 500 is a set of fragmentary knowledge (referred to as schedule modification rule) obtained by representing qualitative knowledge, which is possessed by experts having a great store of experience such as a skilled operator or regulator with respect to the above described schedule modification method corresponding to the above described evaluated value 410, in such a form that the qualitative knowledge can be processed. The function for taking out knowledge 430 squaring or conforming with the above described evaluated value 410 out of the knowledge base 500 and determining the schedule modification rate (referred to as second schedule modification rate 420) is the fuzzy reasoning 400.

The learning function 200 is provided to make the model 100 of neural network learn the sum (referred to as schedule modification rate 210 for learning) of the second schedule modification rate 420, which is the result of fuzzy reasoning based upon evaluation of the process response characteristics performed when the above described operation target 11 is given, in a pair with an input signal 115 for learning (comprising the above described operation target 11 and an initial value 44 of the process variable). At the time of this learning, an internal stat 120 of the model 100 of neural network is used in the learning function 200.

Figure 2:
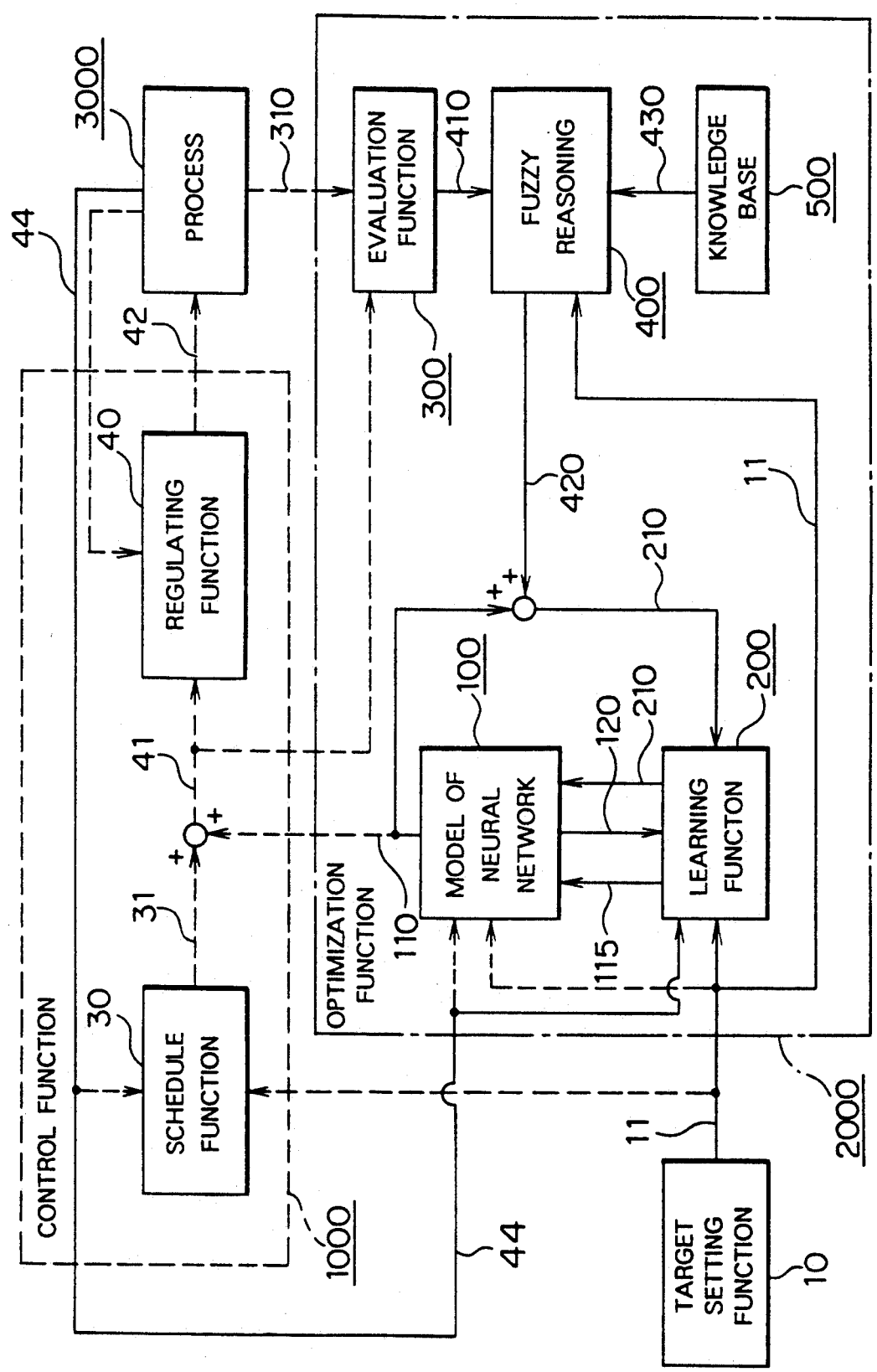
FIG. 2 is a configuration diagram showing function activated in the learning mode, i.e., during the suspension or stoppage of the process in an embodiment of the present invention.

Activation periods of the above described functions of the present system are classified into two modes, i.e., operation mode and learning mode. FIG. 1 represents the operation mode whereas FIG. 2 represents the learning mode. In FIGS. 1 and 2, solid line arrows mean that information interchange occurs between functions whereas broken line arrows mean that information interchange does not occur.

In the operation mode as shown in FIG. 1, the schedule function 30 produces the basic schedule 31 by considering the initial value 44 of process variable in response to the operation target 11 supplied from the target setting function 10. By using internal connectivity information learned beforehand, the model 100 of neural network derives the first schedule modification rate 110 corresponding to the above described operation target 11 and the initial value 44 of process variable.

Therefore, addition of the basic schedule 31 and the first schedule modification rate 110 as described before results in the set point 41 for the regulating function 40.

In response to the above described set point 41, the regulating function 40 determines such manipulating value 42 that the variable 43 of the process 3000 may follow it and manipulates the process 3000. In case a feedback control scheme is adopted as the regulating function 40 at this time, the process variable 43 also becomes input information. When the process operates in accordance with the above described manipulating value 42, the evaluation function 300 in the optimization function 2000 evaluates the response characteristics 310 of the variable of the process 3000 and the resultant evaluated value 410 is used in the fuzzy reasoning function 400. In case evaluation of the response characteristics becomes necessary for association with schedules at this time, the above described set point 41 also becomes input information to the evaluation function 300.

In the learning mode as shown in FIG. 2, the fuzzy reasoning function 400 takes out knowledge, which squares or conforms with the evaluated value 410 concerning the response characteristics 310 of the process 3000 derived by the above described evaluation function 300, out of the knowledge base 500 and determines the second schedule modification rate 420. Therefore, the sum of the first schedule modification rate 110 derived in the operation mode and the above described second schedule modification rate 420, i.e., the schedule modification rate 210 for learning becomes the schedule modification rate required for the process to operate more favorably with respect to the operation target 11.

When the above described operation target 11 and the initial value 44 of process variable are inputted to the model 100 of neural network, the learning function 200 makes the model 100 of neural network learn so that the same value as the above described schedule modification rate 210 for learning may be outputted as the first schedule modification rate 110. This learning method will be described later in detail. By repeating the startup, stoppage and output change of the process 3000, however, the above described operation mode and learning mode are repeated alternately. In this way, the model 100 of neural network can output more adequate schedule modification rate (as the first schedule modification rate 110 in this case) in a self-enhancing manner.

That is to say, control performance of the present control system can be improved in a self-enhancing manner as actual operation results are accumulated.

Basic operation of the control system whereto the present invention is applied has heretofore been described. Operation in case where the present control system is applied to startup control of the thermal power plant will now be described concretely.

Schedule function will first be described.

The present function is provided for producing the basic schedule 31 on the basis of the operation target 11 and the initial value 44 of process variable at that time. This producing method has heretofore been used generally and is basically the same as the method discussed in "Thermal stresses influence starting, loading of bigger boilers, turbines", Electrical World, Feb. 7, 1966 or the method discussed in "Steam turbine start up method based on predictive monitoring and control of thermal stresses", IEEE Transactions on Power Apparatus and Systems, April 1985, for example.

This will hereafter be described briefly. First of all, from the temperature and pressure of main steam 18 in the process 3000 shown in FIG. 3, temperature of steam behind the first stage of a high-pressure turbine 3110 is derived. Temperature difference between the temperature of internal wall of casing behind the first stage of the high-pressure turbine 3110 and the above described temperature of steam behind the first stage is then derived.

On the basis of this temperature difference, the speed rise rate of the turbine and the warm up time values i.e., speed holding time values at the speed of 1200, 3100 and 3600 rpm are determined.

Figure 3:
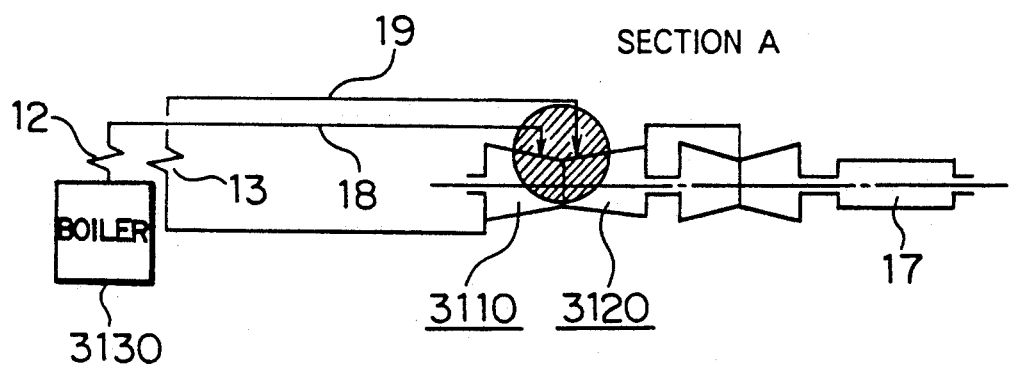
FIG. 3 is a configuration diagram showing the principal device configuration of a thermal power plant which is an embodiment of a controlled process according to the present invention.

With reference to FIG. 3, numeral 3130 denotes a boiler and numerals 12 and 13 denote reheaters. Numeral 19 denotes reheat steam and numeral 17 denotes a generator.

Figure 4:
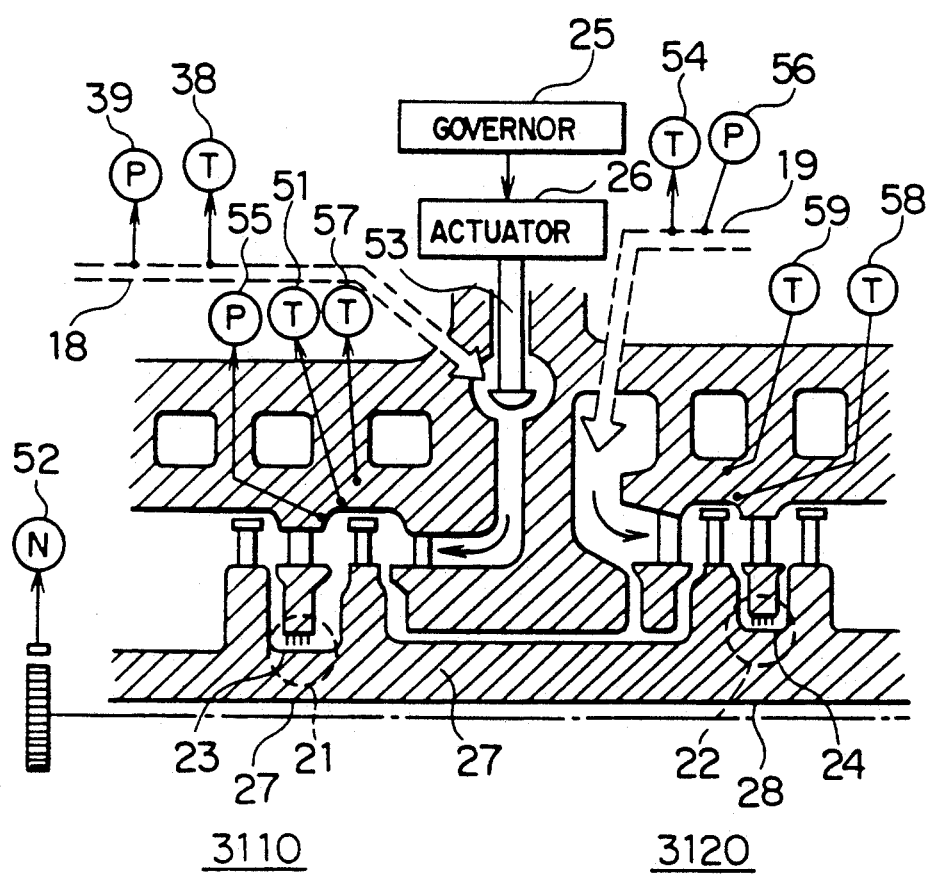
FIG. 4 is a sectional view of a portion corresponding to a portion A of FIG. 3 and shows the axial sectional view of high-pressure and medium-pressure turbine inlets and detector positions which become important to administration of thermal stress of turbine in the thermal power plant shown in FIG. 3.

FIG. 4 is an enlarged view of a section A shown in FIG. 3. FIG. 4 shows the axial sectional shape of especially steam introductory parts of the high-pressure turbine 3110 and an intermediate-pressure turbine 3120. The temperature of the main steam 18 is measured by a temperature detector 38, and the pressure of the main steam is measured by a pressure detector 39 whereas the internal wall temperature of casing behind the first stage of the high-pressure turbine is measured by a temperature detector 51. The turbine speed is measured by a speed detector 52.

The present schedule function 30 is drawn up on the basis of actual operation results of the plant and thermal stress analysis of the turbine. The schedule function 30 is provided to determine the speed rise rate and warm up time so that the thermal stress generated during startup may not become excessive when the operation target and the process state at that time are given. In an actual power plant, the load increase rate and load holding time are determined in accordance with a method similar to the above described method not only at the time of turbine speed rise but also at the time of load increase as described in both aforementioned theses.

In this way, all schedules from the start of startup until the completion of startup, i.e., the basic schedule 31 can be produced. The first schedule modification rate 110 derived from the optimization function 2000 in accordance with a method described later is added to the determined basic schedule 31. The resultant set point 41 is supplied to the regulating function 40.

The regulating function 40 regulates the rate of fuel feed to the boiler, rate of air flow, rate of water feed, and control valve opening of the turbine as manipulating values 42 so that the process variable 43 to be controlled, i.e., the speed and load startup pattern may follow the set point 41. Since these adjustments are realized by feedback control such as PID (proportional plus integral plus derivative) control used generally and widely, detailed explanation will be omitted.

As shown in FIG. 4, the opening of a control valve 53 of the turbine is determined by the manipulating value supplied from a governer 25 to an actuator 26 every moment.

The method for determining the second schedule modification rate 420 by using the evaluation function 300 for evaluating the response characteristics 310 of the process and the fuzzy reasoning 400 will now be described by referring to FIG. 5.

In the evaluation function 300, the turbine speed, main steam temperature, main steam pressure, reheat steam temperature, reheat steam pressure, initial values of temperature of internal and external walls of casing located behind the first stage of the high-pressure turbine and initial values of temperature of internal and external walls of casing located behind the first stage of the intermediate-pressure turbine are respectively detected by detectors 52, 38, 39, 54, 56, 51, 57, 58 and 59 as the process variables 310 in order to quantitatively evaluate characteristics of turbine thermal stress generated in the plant startup process. By using these variables in a nonstable heat transfer calculation, dynamic characteristics of thermal stress are derived.

As shown in FIG. 4, the thermal stress of the turbine should be monitored in four positions in total, i.e., rotor surfaces 23 and 24 of labyrinth packings 21 and 22 behind the first stage and rotor bores 27 and 28 in both the high-pressure turbine 3110 and the intermediate-pressure turbine 3120. The above described initial values of temperature of internal and external walls of the casing are used to assess initial values of temperature distribution within the rotor which cannot be measured actually.

Since the method for deriving dynamic characteristics of thermal stress by means of nonstable heat transfer calculation is described in detail in "Turbine control system based on prediction of rotor thermal stress", IEEE Transactions on Power Apparatus and Systems, August 1982, its description will be omitted.

Figure 5:
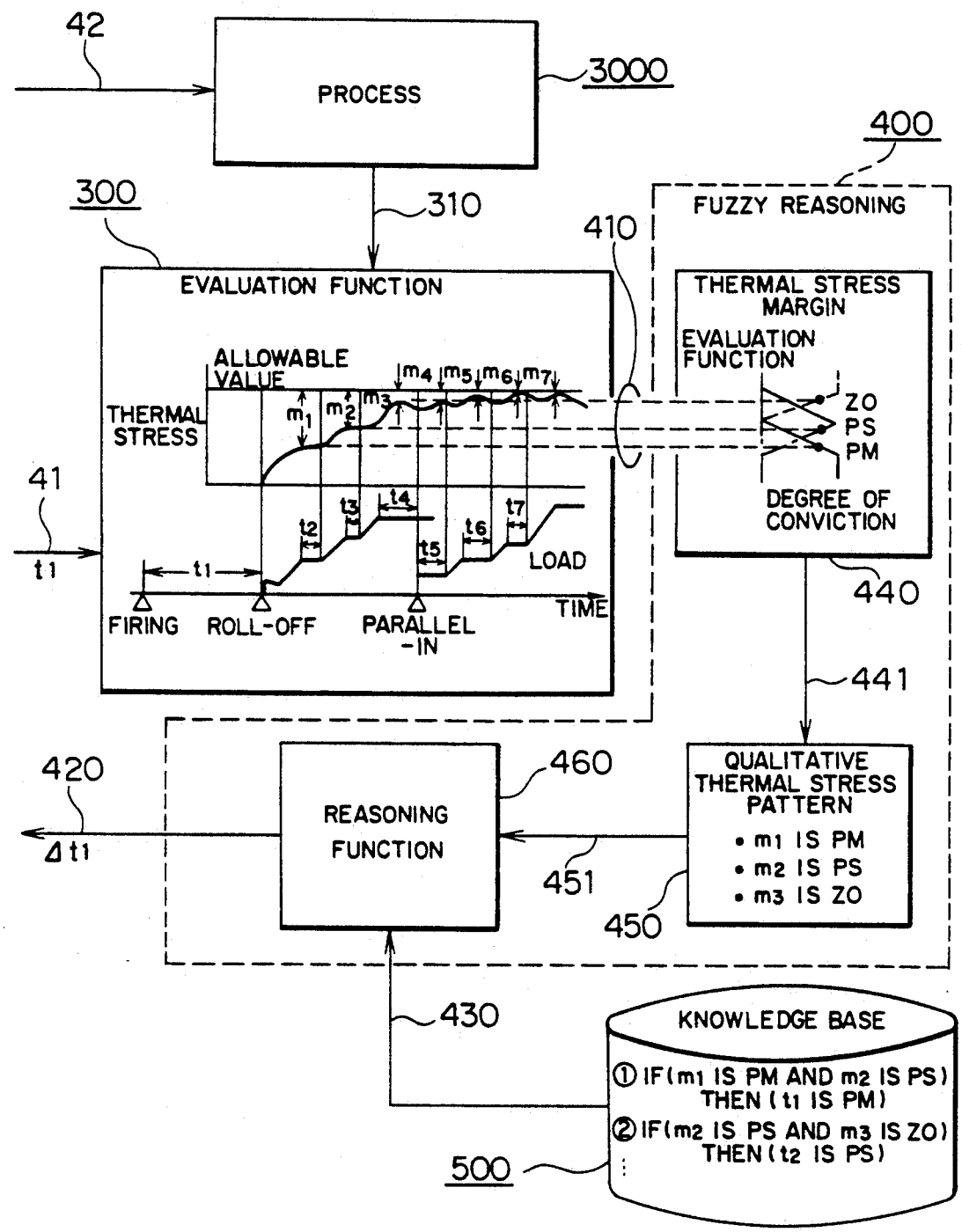
FIG. 5 is a schematic diagram showing a modification method of manipulation rates using evaluation function of control characteristics and fuzzy reasoning which is an embodiment of the present invention.
Figure 6:
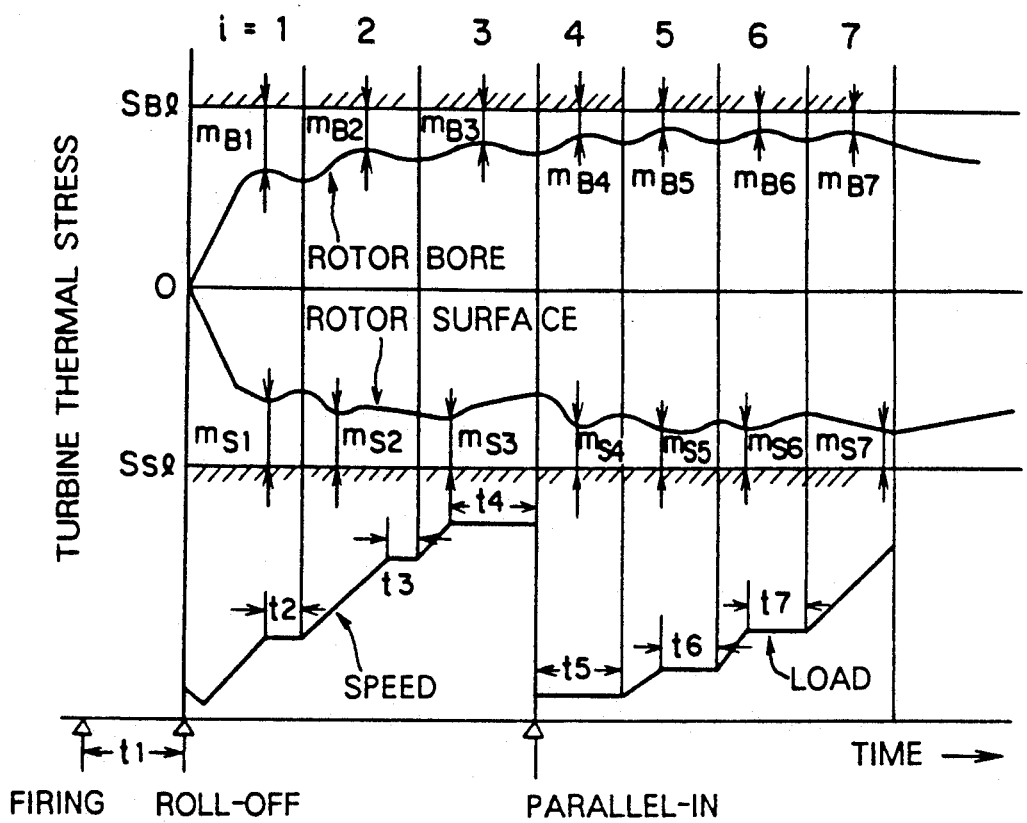
FIG. 6 is a characteristic diagram showing the relation between the startup schedule and turbine thermal stress.

For description of the evaluation function 300, only one of thermal stress characteristics is shown in FIG. 5 in order to prevent the drawing from being complicated. The relation between the evaluation function 300 and the fuzzy reasoning 400 will now be described further concretely. In order to facilitate representing the knowledge of experts, i.e., the causal relation of thermal stress margin and schedule parameter as knowledge for fuzzy reasoning, the startup process is considered in fuzzy reasoning 400 by dividing it into seven sections as shown in FIG. 6. Here, the thermal stress margin is a magin with respect to constraint $S_{SI}$ of compressive stress as for the rotor surface and it is a margin with respect to constraint $S_{Bl}$ of tensile stress as for the rotor bore. Further, $m_{Si}$ and $m_{Bi}$ denote minimum stress margins of the rotor surface and the rotor bore in a section i, respectively. As described before, stresses of four positions, i.e., the rotor surface and the rotor bore of the high-pressure turbine and the intermediate-pressure turbine are actually considered. For brevity, however, distinction between the high pressure and intermediate pressure is not shown in FIG. 6. That is to say, $m_{Si}$ and $m_{Bi}$ have smaller values among stress margins of the high-pressure turbine and the intermediate-pressure turbine as representative values.

The "schedule parameters" refer to time required for temperature rise ($t_1$), speed holding time ($t_2$, $t_3$, $t_4$) and load holding time ($t_5$, $t_6$, $t_7$). There is strong correlation between the thermal stress pattern at the startup time and schedule parameter. As the thermal stress margin becomes larger, the parameters can be shortened. In case thermal stress characteristics at the time of startup are given, the operator and regulator empirically know to what extent parameters should be modified according to the margin. By making the most of this empirical qualitative knowledge, the schedule modification rate for optimization is determined.

Figure 7:
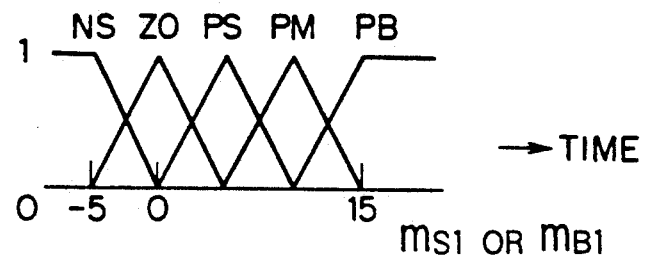
FIG. 7 is a diagram showing a membership function for evaluating the thermal stress margin of the turbine.

A thermal stress margin evaluation function 440 shown in FIG. 5 determines which class of the membership function divided into five steps shown in FIG. 7 the thermal stress margins $m_{Si}$ and $m_{Bi}$ of each section derived in the evaluation function 300 as the evaluated value 410 belong to. With reference to FIG. 7, P denotes positive, N negative, B big, M medium, S small and ZO zero.

Figure 8:
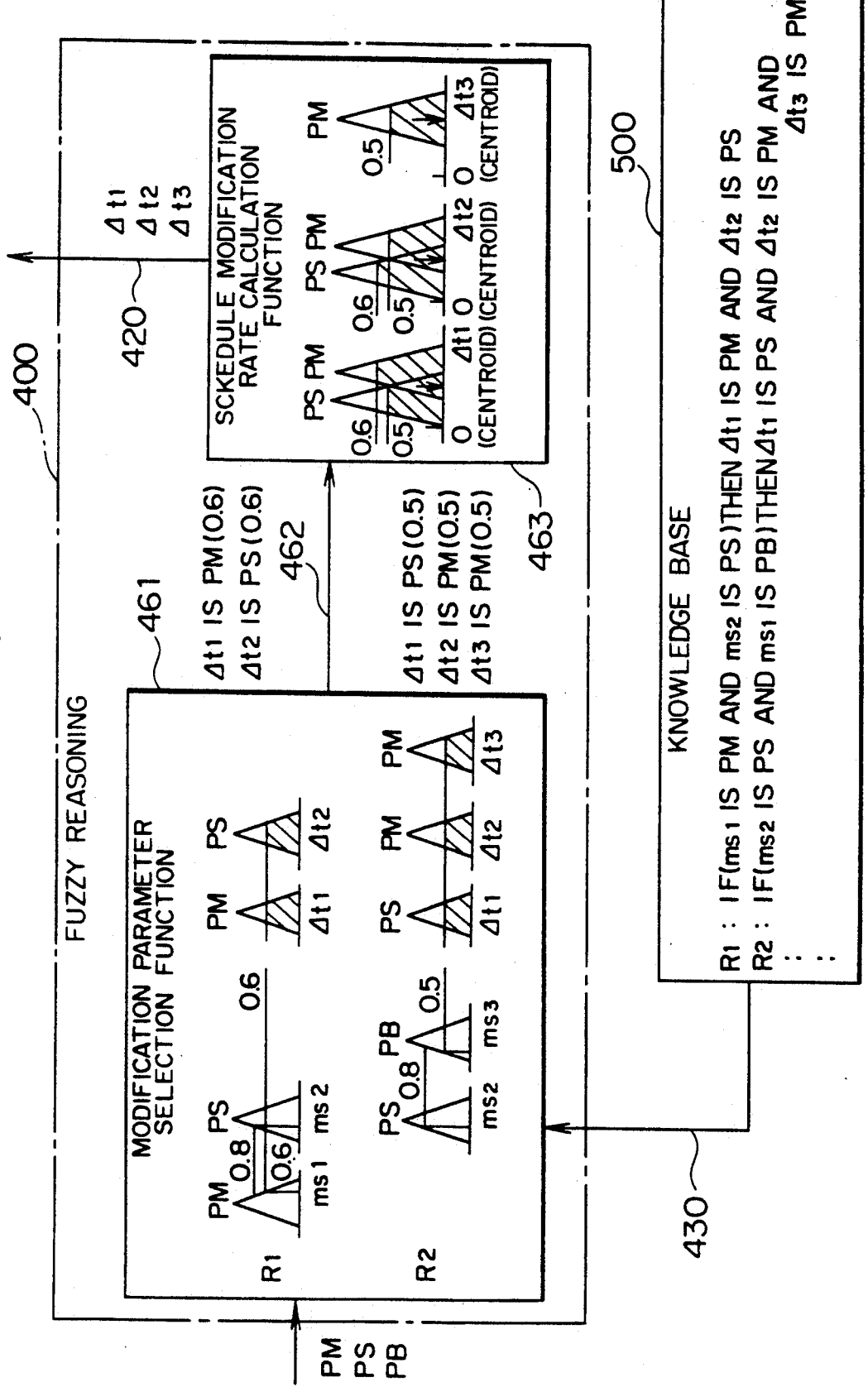
FIG. 8 is a diagram showing the procedure for calculating schedule modification rate by means of fuzzy reasoning.

Qualitative thermal stress evaluated values 441 thus evaluated are put in order as a qualitative thermal stress pattern 450. Individual characteristics 451 thus put in order are inputted to a reasoning function 460 and compared with a large number of schedule modification rules stored in the knowledge base 500. In order to prevent complicatedness, schedule modification rules shown in the knowledge base 500 of FIG. 5 are expressed by simple representations. In reality, however, representations shown in FIG. 8 are used. That is to say, two or more items comprising the IF part (condition part) and THEN part (conclusion part) are used. This schedule modification rule is fragmentary qualitative knowledge such as "if the thermal stress pattern satisfies a certain condition, which parameter should be modified to what extent." For example, rule 1 ($R_1$) shown in FIG. 8 means "if $m_{S1}$ is PM and $m_{S2}$ is PS, determine $\Delta t_1$ as PM and determine $\Delta t_2$ as PS." In this case, P (positive) used in the conclusion section defines the extent in such a direction as to shorten the schedule. On the contrary, N (negative) indicates the extent in such a direction as to prolong the schedule.

A modification parameter selection function 461 compares the thermal stress margin evaluation result 451 with the schedule modification rules 500 stored in the knowledge base and selects a modification parameter concerning the parameter modification rate for each of matching rules. A schedule modification rate calculation function 463 derives the centroid position for each of modification parameters 462 thus selected and determines this as modification rate. Such a schedule modification method is similar to the method described in JP-A-63-94004. The modification rate thus determined ($\Delta t_1$, $\Delta t_2$ and $\Delta t_3$ in the example of FIG. 8) is the second schedule modification rate 420.

Therefore, the second schedule modification rate 420 is added to the first schedule modification rate 110 outputted from the model 100 of neural network. As a result, more adequate modification rate is determined as the schedule modification rate 210 for learning. The learning function 200 described below stores the relation among the schedule modification rate 210 for learning, the operation target 11 supplied from the target setting function 10 before startup, and the initial value 44 of process variable into the model 100 of neural network as network information. That is to say, when the same operation target and initial value 44 of process variable are given in the next startup, the same value as the above described schedule modification rate 210 for learning is ouputted from the model 100 of neural network as the first schedule modification rate 110.

In this way, operation characteristics of the process 3000 can be improved in a self-enhancing manner as actual operation results are accumulated. (Startup time is shortened in the present embodiment.)

The structure of the model 100 of neural network and the learning method in the learning function 200 will now be described.

Figure 9:
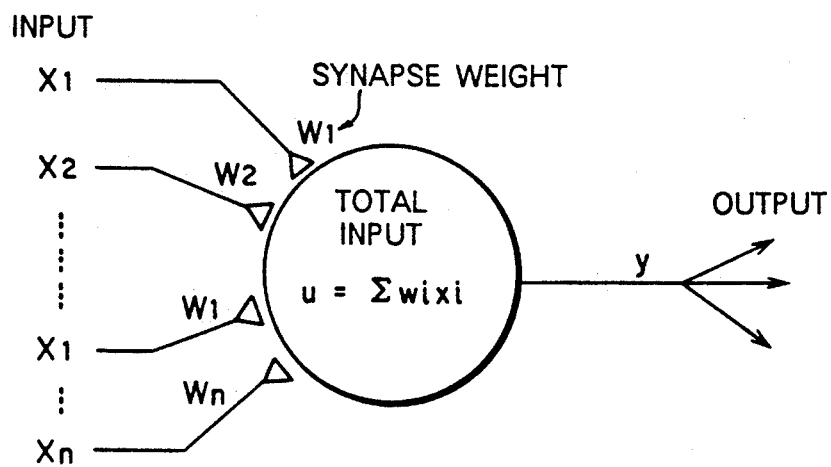
FIG. 9 is a schematic diagram showing a single neuron model of a model of neural network which is an embodiment of the present invention.

FIG. 9 shows one unit model 111 included in the model 100 of neural network. It is now assumed that each of input signals $X_1, X_2, ---, X_n$ to the unit assumes value area (0, 1) whereas each of synapse weights $W_1, W_2, ---, W_n$ assumes value area $(-\infty, +\infty)$. Assuming now that input $U_i$ conveyed from an i-th input $X_i$ to the unit is represented as $$U_i = W_i X_i \quad (1)$$

the total input U to the unit becomes as follows.

$$U = \sum_{i=1}^{n} U_i \quad (2)$$

Figure 10:
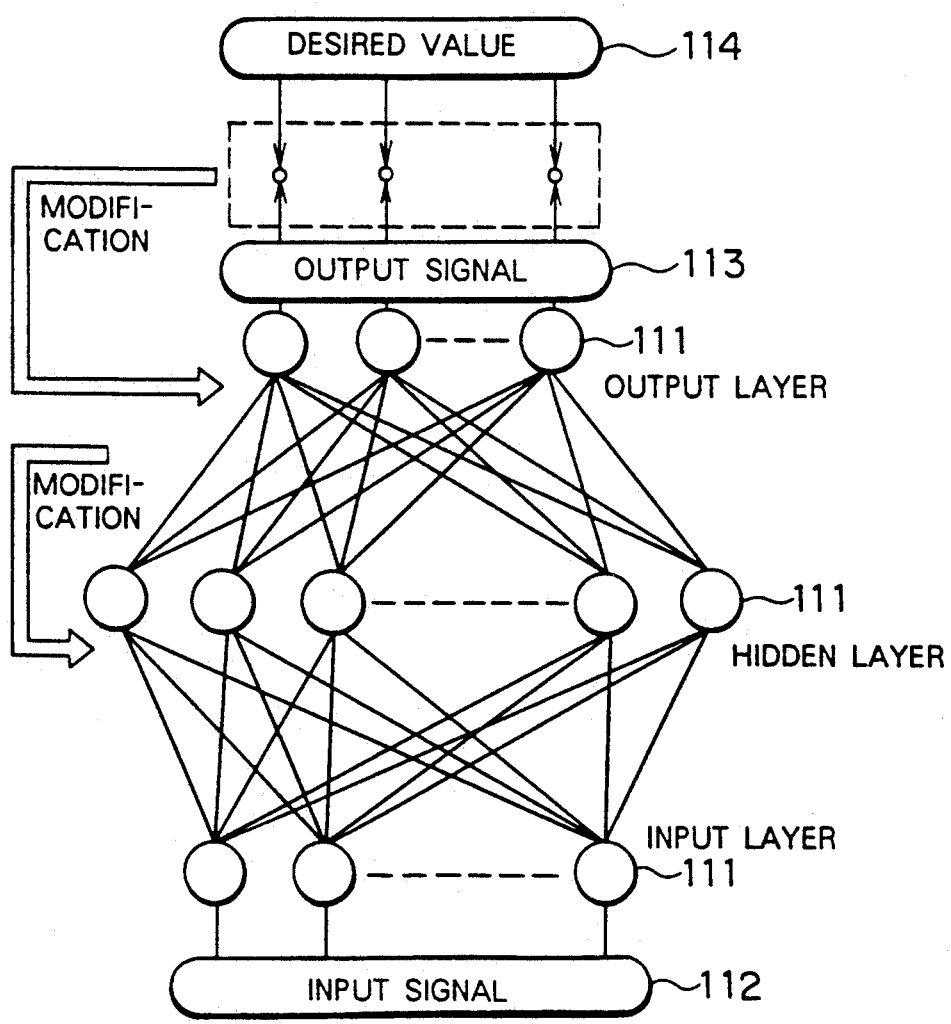
FIG. 10 is a diagram for explaining the basic concept of a model of neural network comprising neuron models of FIG. 9 so arranged as to form multiple layers and learning.

Further, unit output y is defined as $$y = \frac{1}{1 + e^{-U + U_0}} \quad (3)$$

where $U_0$ represents a bias. In the present embodiment, the model 100 of neural network is formed by arranging the above described unit models 111 in a layer form as shown in FIG. 10 and coupling the output signal of each unit 11 to the input signal of each unit 111 of the succeeding layer. The structure of the above described unit model 111 and the model 100 of neural network is described in detail in the MIT Press, Neurocomputing Foundations of Research, 1986, pp. 675–695. In this thesis, a learning algorithm (refferred to as backpropagation) is described. In this learning algorithm, strength of connectivity of the input section of each unit of the hidden layer, i.e. synapse weight is modified in accordance with an error between an output signal pattern 113 and a desired value pattern 114 so that the output signal pattern 113 may become the desired value pattern 114 when an input signal pattern 112 is supplied to the input layer as shown in FIG. 10 of the present invention.

In the learning function 200 of the present embodiment as well, backpropagation described in the aforementioned thesis is used as the learning algorithm itself.

Figure 11:
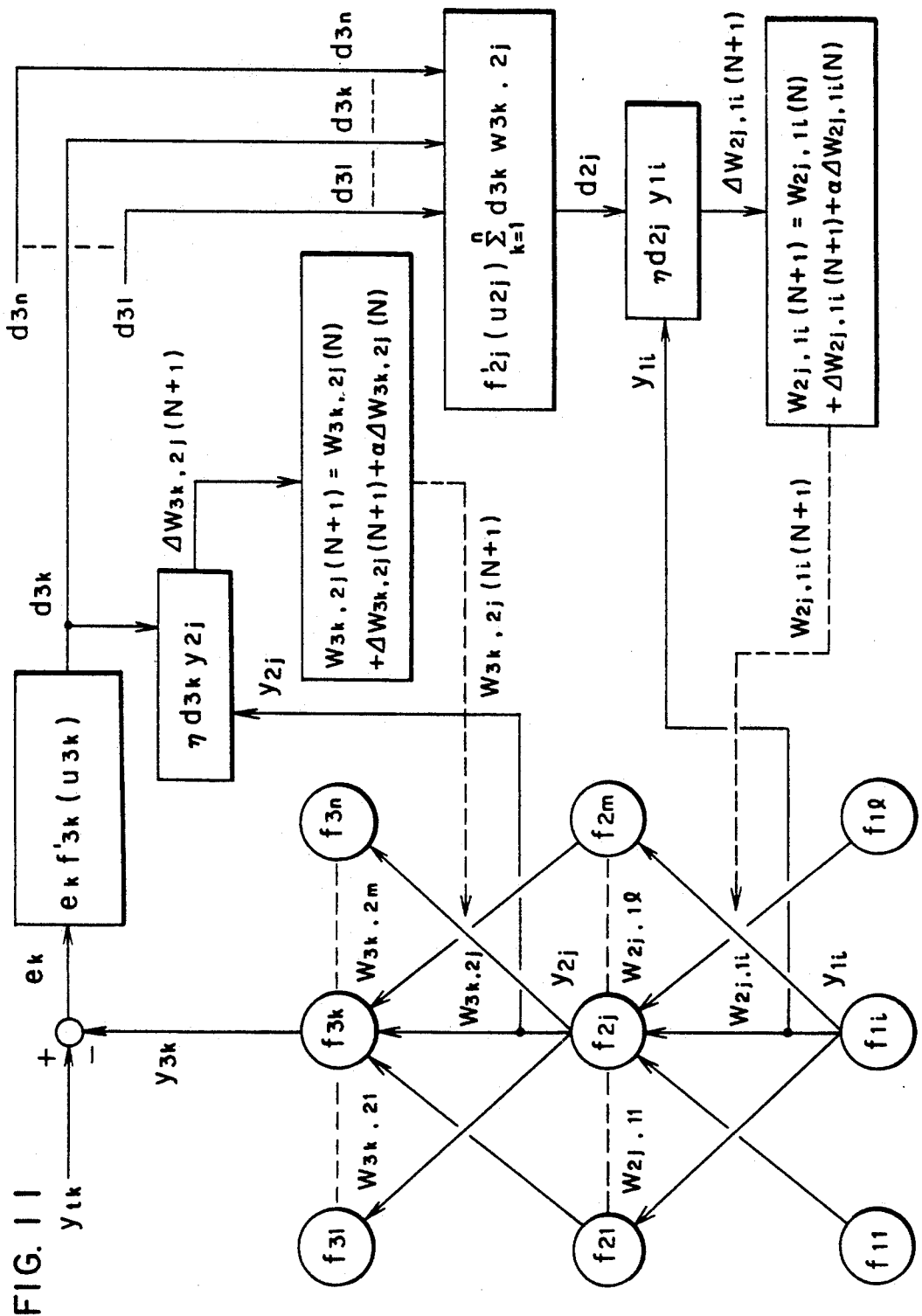
FIG. 11 is a diagram showing learning algorithm of a model of neural network.

FIG. 11 concretely shows the algorithm of backpropagation. In order to facilitate understanding the algorithm, FIG. 11 shows synapse weight modification procedure for making a k-th output signal $y_{3k}$ of the output layer square with a desired value $y_{tk}$. The algorithm shown in FIG. 11 will hereafter be described concretely. First of all, an error $e_k$ between the k-th output signal $y_{3k}$ and the desired value $y_{tk}$ is represented by the following equation.

$$e_k = y_{tk} - y_{3k} \quad (4)$$

Effectiveness $d_{3k}$ of error at an activation level $U_{3k}$ of the unit is represented as $$d_{3k} = e_k f'_{3k}(U_{3k}) \quad (5)$$

where $$f'(U) = \frac{df}{dU} = \frac{d}{dU} \frac{1}{1 + e^{-U + U_0}} \quad (6)$$

Therefore, modification rate $\Delta W_{3k, 2j(N+1)}$ of synapse weight $W_{3k, 2j}$ located at j-th input section in the k-th unit of the output layer is represented as $$\Delta W_{3k, 2j(N+1)} = \eta \cdot d_{3k} \cdot y_{2j} \quad (7)$$

where N is a character representing the last time and $\eta$ is referred to as learning constant. Further, $y_{2j}$ denotes a j-th output signal of the hidden layer. In order to realize smooth convergence, however, the modification rate derived in equation (7) is not used as it is, but the modification rate is modified by the following equation. A new synapse weight $W_{3k, 2j(N+1)}$ is thus obtained as $$W_{3k, 2j(N+1)} = W_{3k, 2j(N)} + \Delta W_{3k, 2j(N+1)} + \alpha \cdot \Delta W_{3k, 2j(N)} \quad (8)$$

where $\alpha$ is referred to as smoothing constant. The modification method of synapse weight of the input section of the output layer has heretofore been described.

The modification method of synapse weight of the input section of the hidden layer will now be described. FIG. 11 shows the modification method of synapse weight $W_{2j, li}$ located at an i-th input section of a j-th unit of the hidden layer. Effectiveness $d_{2j}$ of an error at an activation level $U_{2j}$ of the unit in this case should be determined in due consideration of the error of all unit outputs of the output layer and is represented by the following equation (9).

$$d_{2j} = f'_{2j}(U_{2j}) \sum_{k=1}^{n} d_{3k} \cdot W_{3k, 2j} \quad (9)$$

Therefore, modification rate $\Delta W_{2j, li(N+1)}$ of synapse weight located at an i-th input section in the j-th unit of the hidder layer is represented as $$\Delta W_{2j, li(N+1)} = \eta \cdot d_{3j} \cdot y_{li} \quad (10)$$

where N is a character representing the last time and $\eta$ is referred to as learning constant. Further, $y_{li}$ denotes an i-th output signal of the input layer. In order to realize smooth convergence in the same way as the output layer, the modification rate derived in equation (10) is not used as it is, but the modification rate is modified by the following equation. A new synapse weight $W_{2j, li(N+1)}$ is thus obtained as $$W_{2j, li(N+1)} = W_{2j, li(N)} + \Delta W_{2j, li(N+1)} + \alpha \cdot W_{2j, li(N)} \quad (11)$$

where $\alpha$ is referred to as smoothing constant.

By repeating the above described arithmetic processing expressed by equations (4) to (11), the error can be minimized. That is to say, it is possible to make the output signal pattern of the output layer square or conform with the desired value pattern. As a result, the input signal pattern is stored (learned) as synapse weight distribution within the model of neural network (i.e., strength distribution of connectivity within the circuit). Further, if a different input signal pattern is presented to the input layer and a different pattern corresponding thereto is presented as the desired value pattern, the above described algorithm is activated and new synapse weight distribution is stored.

By using such an algorithm, a plurality of learning samples can be stored into the same model of neural network. If the model of the neural network after completion of learning is used, the same pattern as an output signal pattern used at the time of learning is outputted from the output layer when the same pattern as a pattern already learned is inputted. Even if a pattern which has not been learned yet is inputted, a similar output signal pattern depending upon the degree of similarity to a pattern already learned is obtained.

Figure 12:
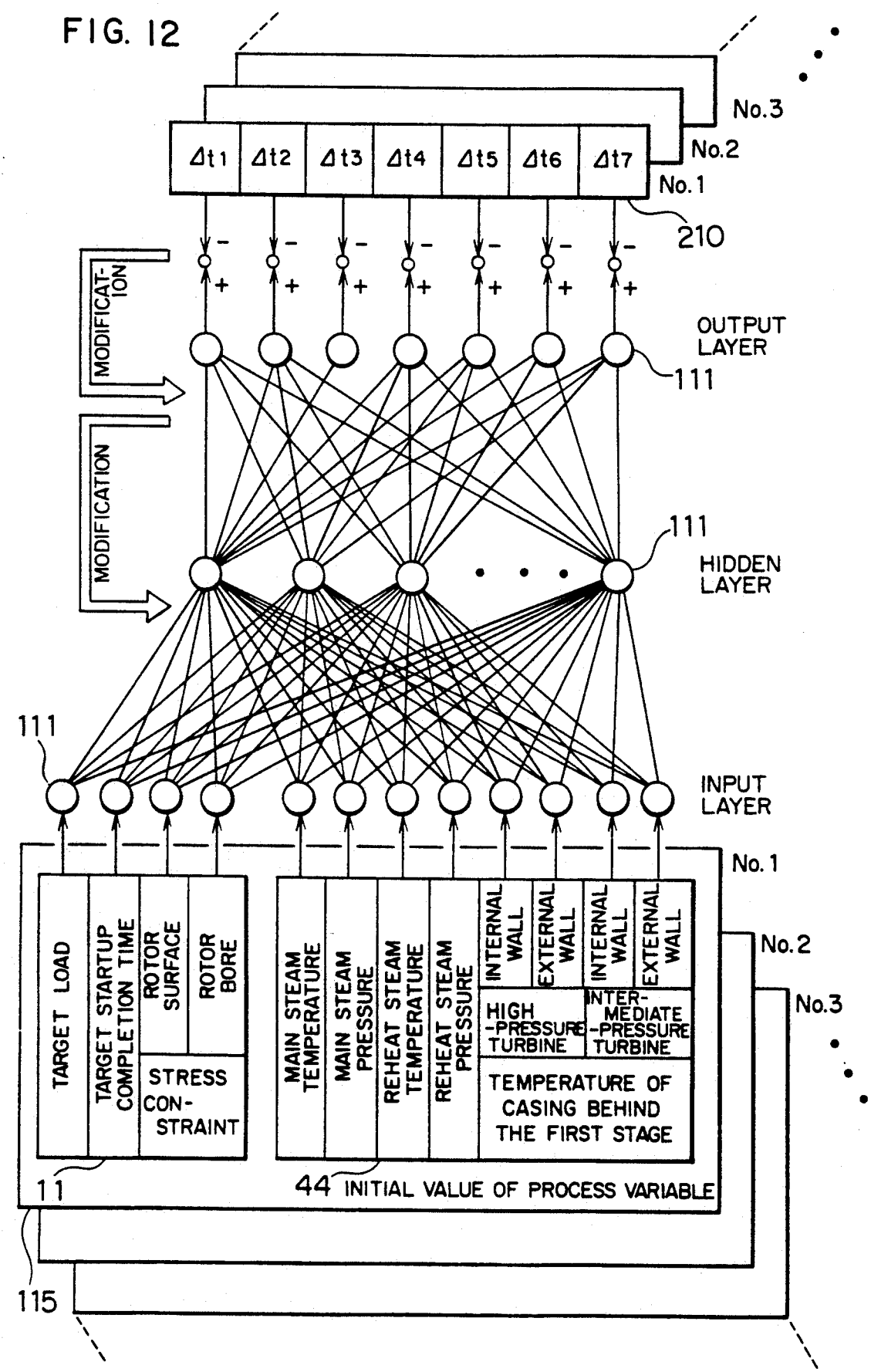
FIG. 12 is a diagram showing the case where a model of neural network and a learning scheme are applied to startup control of a thermal power plant.

FIG. 12 shows the relation of the model 100 of neural network with respect to its input signal 115 for learning and the schedule modification rate 210 for learning in case the above described model of neural network and learning scheme are applied to the present embodiment. The input signal 115 for learning comprises the operation target 11 at the startup of the last time and the initial value 44 of process variable. Herein, the operation target 11 comprises target load, target startup completion time, rotor surface stress constraint and rotor bore stress constraint. In reality, however, the target startup completion time is converted into time measured from the current time until startup completion and inputted.

Further, the initial value 44 of process variable comprises main steam temperature, main steam pressure, reheat steam temperature, reheat steam pressure, and internal wall temperature and external wall temperature of casing behind the first stage of the high-pressure and low-pressure turbines. That is to say, the number of units of the input layer is 12 whereas the number of units of the output layer is 7. Further, the number of units of the hidden layer need not be strictly stipulated. In the present embodiment, the hidden layer has a variable structure so that the number of its units may be changed according to learning characteristics.

As actual operation results are accumulated in the operation mode, a new input signal 115 for learning and a new schedule modification rate 210 for learning are successively presented to the input layer and the output layer of the model 100 of neural network, respectively. On all such occasions, synapse weights within the model of neural network are improved by the learning function 200. This is the basic principle of realization of self-enhancement in the present system.

Figure 13:
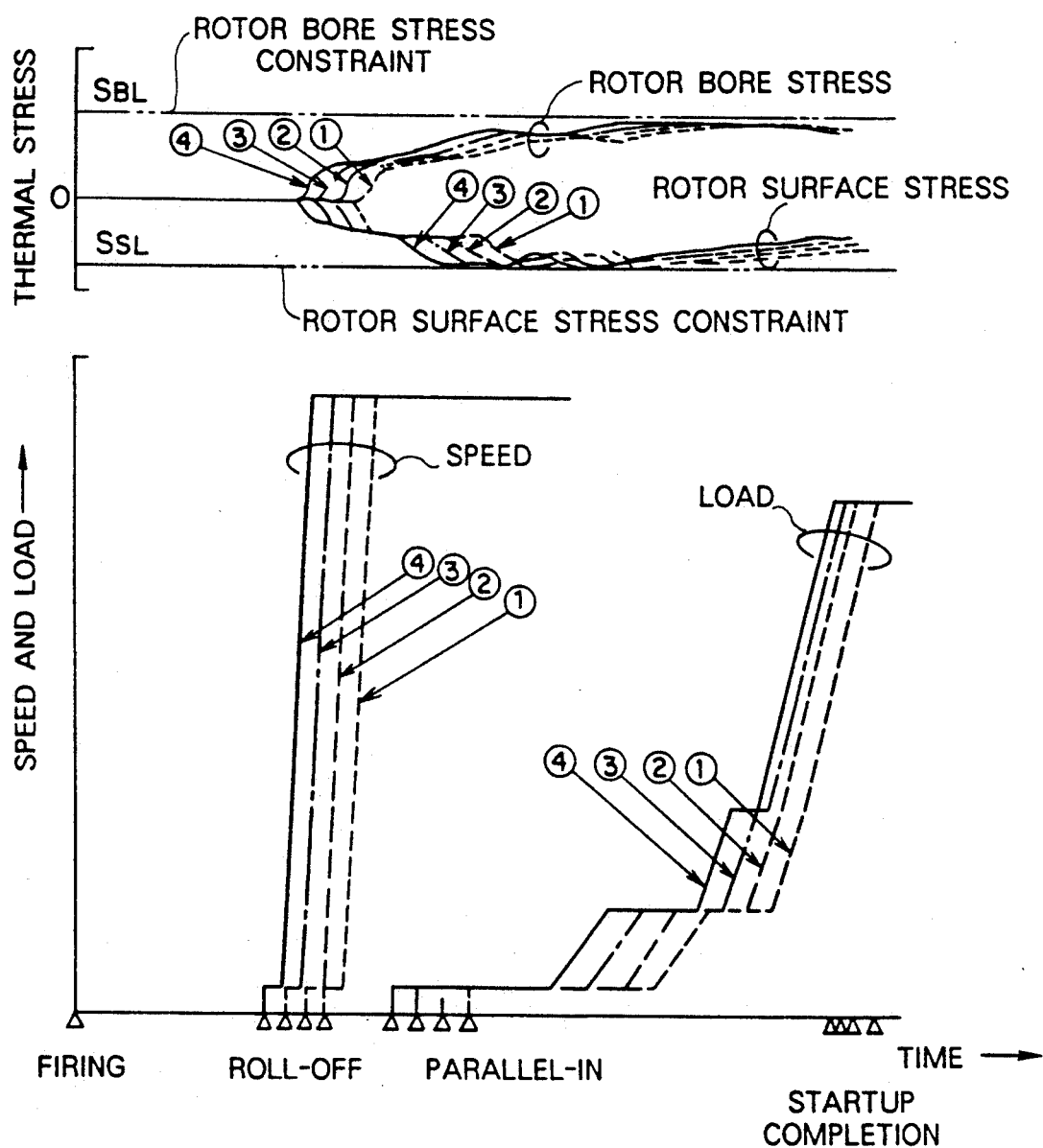
FIG. 13 is a characteristic diagram showing how startup characteristics of the plant are improved by application of the present invention.

FIG. 13 shows improvement of startup characteristics (shortening of startup time in this case) obtained in the embodiment of the present invention as the control system accumulates actual startup results. Characteristics concerning four executed startups are represented by numerals in FIG. 13.

The thermal stress generated by startup of the first time has a large margin with respect to the constraint. By repeating startup, however, the constraint can be used effectively, resulting in shortened startup time. FIG. 13 shows startup characteristics by taking the instant of firing as reference. If the operation target is startup completion time, however, other temporal administration can be performed by taking the startup completion time as reference. In case the parallel-in time or roll-off time becomes the operation target as well, the same holds true and any new concept is not required in applying the present invention.

In the above described embodiment of the present invention, seven schedule parameters in total comprising time required for temperature rise, speed holding time and load holding time are used for optimization. However, schedule parameters for optimization need not necessarily be limited to these parameters. Even if expansion to other parameters such as speed rise rate and load increase rate included in schedule parameters is performed and they are optimized, the basic concept of the present invention is not changed at all.

Embodiments of the present invention have been described by laying stress on optimization concerning shortening of startup time. When a plant is actually operated, various demands are made according to the situation of that day in many cases. For example, various demands such as energy consumption caused by operation, machine life consumption, accuracy of time required for target attainment like startup completion time, attainment accuracy with respect to the target state value, accuracy with respect to state transition rate, consumption of resource such as water or chemicals, and margin against operational constraint are made. The operator expects attainment of necessary operation characteristics by performing weighting with respect to the above described various demands in accordance with the situation of that day. That is to say, multi-purpose optimization is performed.

Figure 14:
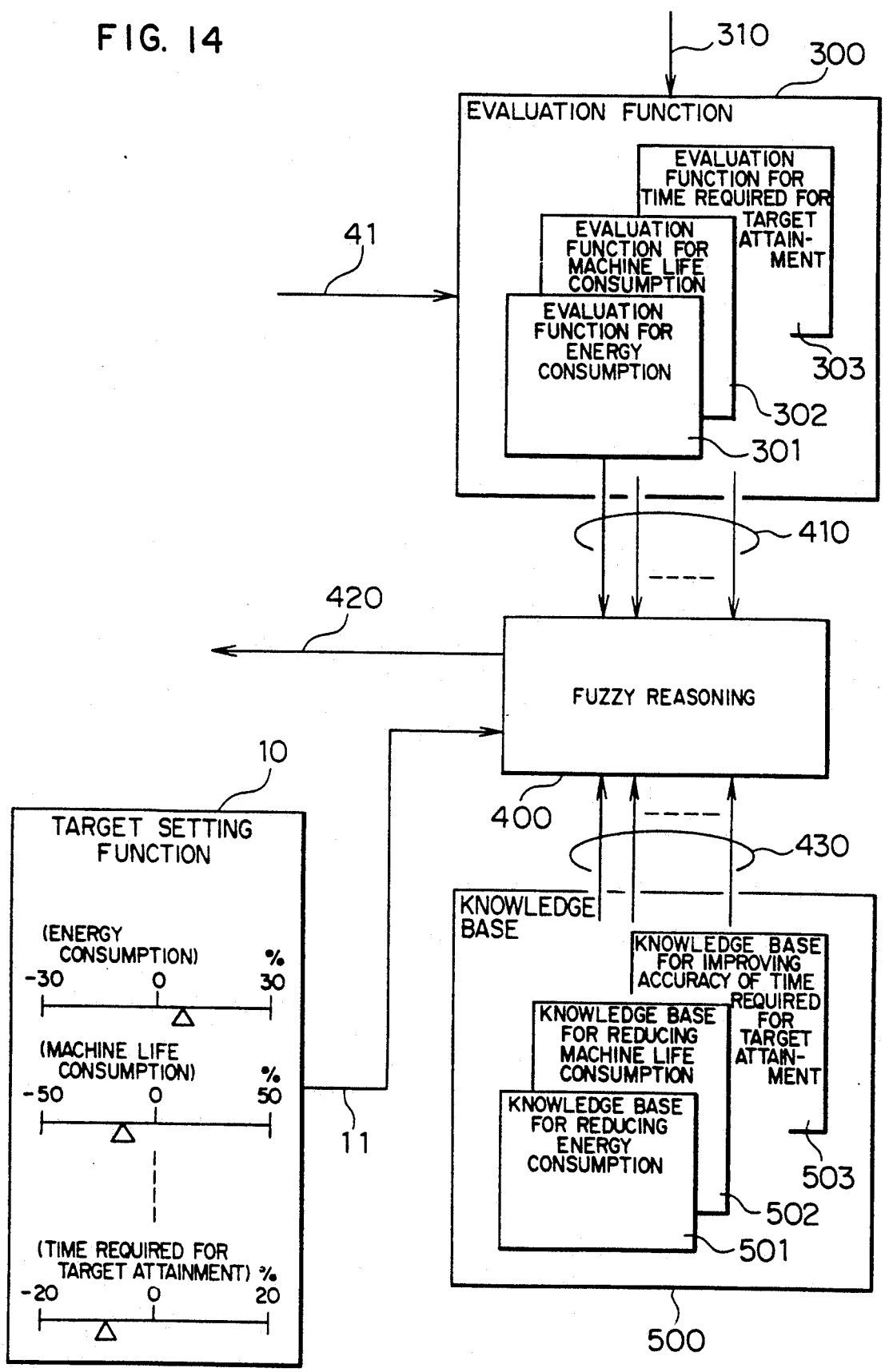
FIG. 14 is a diagram showing the relation between target setting function and fuzzy reasoning in case the present invention is applied to a multi-purpose optimization control system.

The present invention as it is can be applied to such a case as well. FIG. 14 shows only portions of various functions, which are expanded in contents, in the above described embodiment in case the present invention is applied as a multi-purpose optimum control system. That is to say, FIG. 14 shows the target setting function 10, the evaluation function 410, the fuzzy reasoning 400 and the knowledge base 500. In the target setting function 10, the operator sets target accuracies concerning energy consumption, machine life consumption and time required for target attainment by using the illustrated method. The target accuracy is herein defined as error with respect to a standard value separately given. The example of target setting of FIG. 14 shows the operator's desire that the energy consumption and machine life consumption may be somewhat large, but the time required for target attainment should be made earlier than usual.

In the evaluation function 300, evaluation function 300 comprising evaluation function 301 for energy consumption, evaluation function 302 for machine life consumption and evaluation function 303 for time required for target attainment are so prepared as to correspond to the above described targets. In order to derive the schedule modification rate with respect to evaluated values 410 supplied from them, the fuzzy reasoning 400 uses the knowledge base (modification rule) 500 comprising various knowledge such as knowledge base 501 for reducing energy consumption, knowledge base 502 for reducing machine life consumption and knowledge base 503 for improving accuracy of time required for target attainment.

If the above described multi-purpose operation targets 11 are supplied to the fuzzy reasoning 400, the output value of membership function set in the conclusion section of a rule included in each of the above described knowledge bases, i.e., the schedule modification rate undergoes scale change in accordance with each target accuracy. Thereby, the second schedule modification rate 420 required for attaining the above described multi-purpose operation target 11 can be derived.

Figure 15:
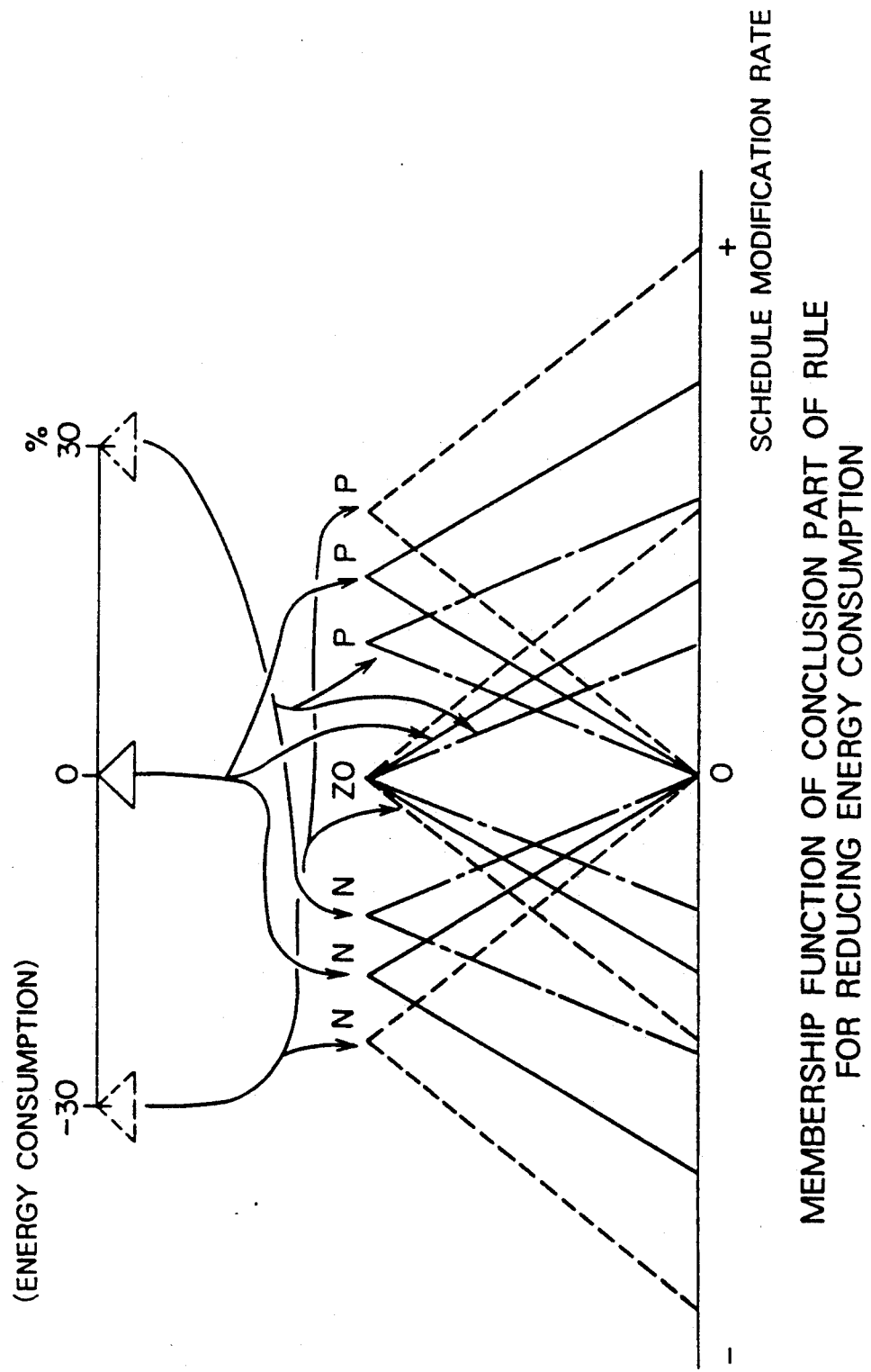
FIG. 15 is a diagram showing the situation of scale change of membership function performed when a target is set for multi-purpose optimization.

FIG. 15 shows scale change by taking the membership function of the conclusion part of rule for reducing the energy consumption. That is to say, in case the target accuracy of energy consumption is set at the plus side, the width of membership function and the schedule modification rate become small and the sensitivity to energy consumption is lowered. In case the target accuracy of energy consumption is set at the minus side on the contrary, the width of the membership function and the schedule modification rate become large and the sensitivity to energy consumption is raised. Although not illustrated, it is a matter of course that the number of units to be prepared in the input layer of the model 100 of neural network is made in case of multi-purpose equal to the number of operation targets 11 and necessary initial values 44 of process variable. As for the output layer as well, it is a matter of course that the number of units is made equal to the number of schedule parameters to be modified.

Embodiments of the present invention heretofore described are provided to optimize the schedule modification rate in accordance with the process operation characteristics. As a matter of fact, however, the present invention can be used for other purposes. In case a PID regulating system (i.e., a regulating system responsive to an input signal for performing proportional, integral and derivative operations) is used in the regulating function, for example, the present invention can be used for optimum regulation of the PID gain.

Further, in the schedule function 30 or the regulating function 40, the present invention can be used for optimum regulation of gain (K) in case various arithmetical operations or logic operations are conducted.

Further, in case function (f) is used in the above described functions 30 and 40, the present invention can be applied to optimum modification of the function (f) or optimum switching of a plurality of prepared functions (f). Further, in case a switching device for manual-/automatic switching or actuator switching is included in the schedule function 30 or the regulating function 40, the present invention can be applied to optimum switching according to operation characteristics. Further, the present invention can also be applied to the case where the regulating function itself is switched according to the operation target.

Further, the present invention can also be applied to the case where specific devices or specific number of devices included in a plurality of devices are combined in an optimum manner and manipulated or operated.

Concrete embodiments applied to the above described various regulations will now be described.

Figure 16:
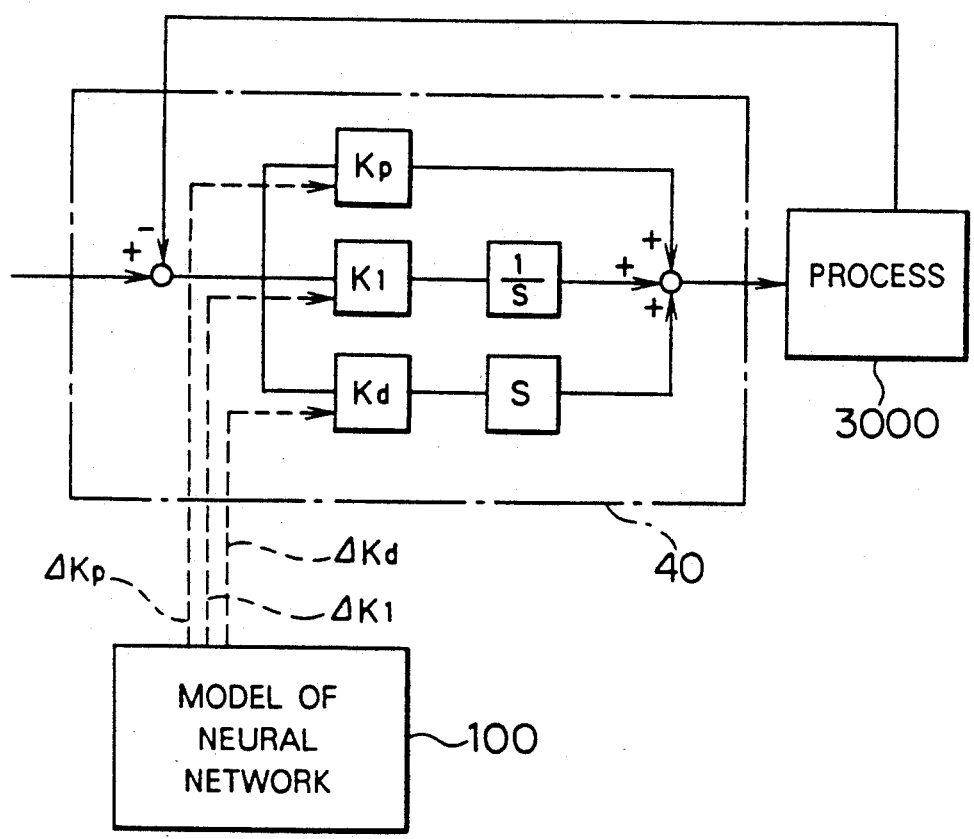
FIG. 16 is a schematic configuration diagram showing the case where the present invention is applied to optimum regulation of PID gain.

First of all, the case where the present invention has been applied to optimum regulation of the PID gain in the regulating function 40 will now be described by referring to FIG. 16. In FIG. 16 and succeeding drawings, the evaluation function, fuzzy reasoning, modification rule (knowledge base) and learning function are omitted. As shown in FIG. 16, $K_p$, $K_i$ and $K_d$ of the PID regulating system 40 are proportional gain, integral gain and derivative gain, respectively. In the present example, the response characteristics 310 of the process 3000 are evaluated by the evaluation function 300 and the schedule modification rate is derived by the fuzzy reasoning 400 in the learning mode by using the knowledge base 500 prepared beforehand for gain modification. The model 100 of neural network learns the schedule modification rate in association with the operation target.

In the operation mode, optimum gain modification rates $\Delta K_p$, $\Delta K_i$ and $\Delta K_d$ can be derived as output values by inputting the operation target 11 to the above described model 100 of neural network which has already learned.

Figure 17:
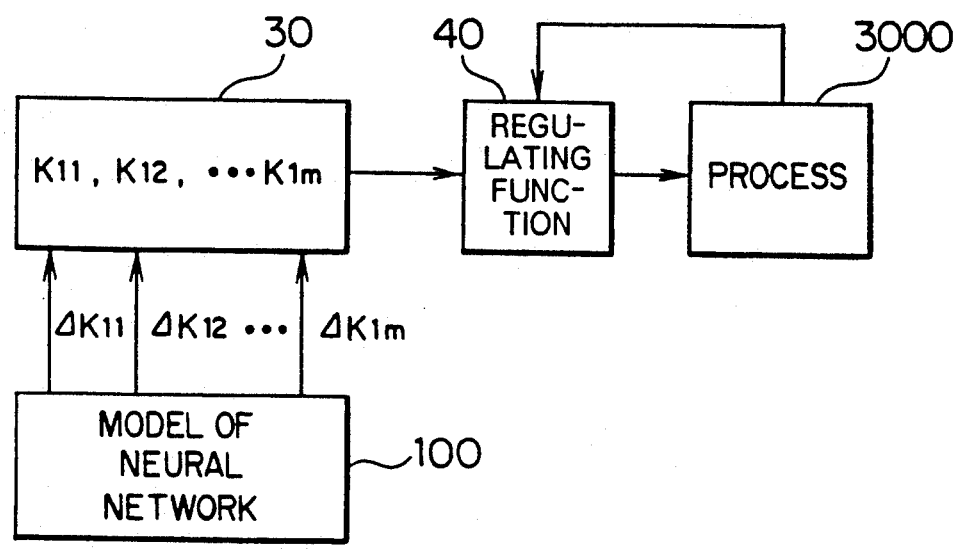
FIG. 17 is a schematic configuration diagram showing the case where the present invention is applied to optimum modification of gain in schedule function.
Figure 18:
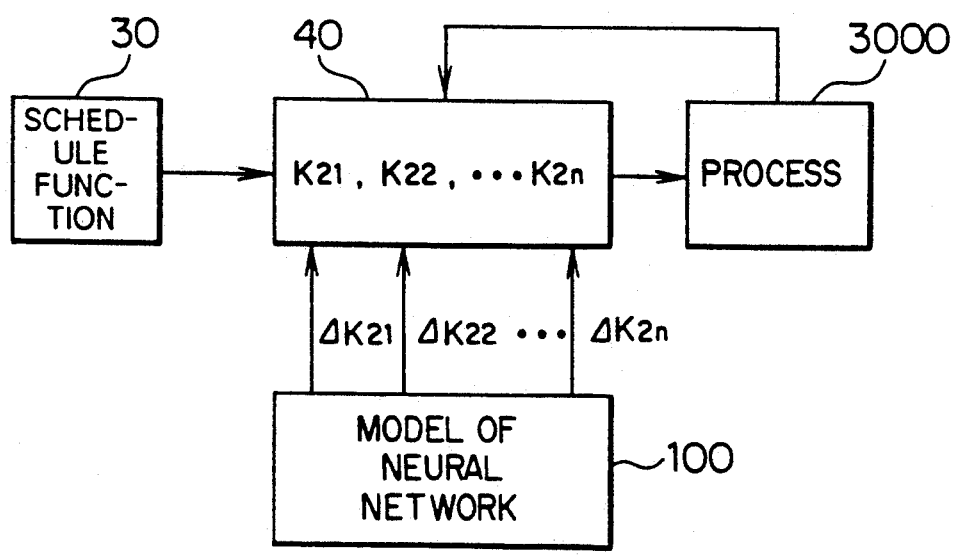
FIG. 18 is a schematic configuration diagram showing the case where the present invention is applied to optimum modification of gain in regulating function.

The case where the present invention is applied to optimum regulation of gain (K) in the schedule function 30 and the regulating function 40 will now be described by referring to FIGS. 17 and 18. As for gain $K_{11}$, $K_{12}$, ---, $K_{1m}$ belonging to the schedule function 30, optimum gain modification rate $\Delta K_{11}$, $\Delta K_{12}$, ---, $\Delta K_{1m}$ can be obtained as output values as shown in FIG. 17 by deriving the gain modification rate from the response characteristics of the process in the learning mode by means of fuzzy reasoning 400 and inputting the operation target 11 in the operation mode to the model 100 of neural network which has learned the gain modification rate in association with the operation target 11. As for gain $K_{21}$, $K_{22}$, ---, $K_{2n}$ belonging to the regulating function 40, optimum gain modification rate $\Delta K_{21}$, $\Delta K_{22}$, ---, $\Delta K_{2n}$ can be obtained as output values as shown in FIG. 18 by deriving the gain modification rate from the operation characteristics of the process by means of fuzzy reasoning 400 in the same way and inputting the operation target in the operation mode to the model 100 of neural network which has learned the gain modification rate in association with the operation target 11.

Figure 19:
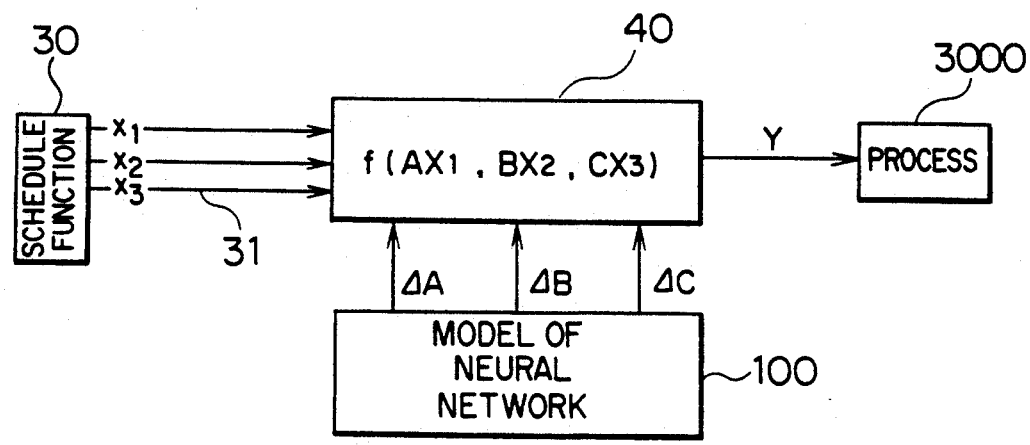
FIG. 19 is a schematic configuration diagram showing the case where the present invention is applied to optimum modification of function.

Optimum modification of function (f) in the schedule function 30 and the regulating function 40 will now be described by referring to FIG. 19. When A, B and C of function $f(AX_1, BX_2, CX_3)$ are given as coefficients, the response characteristic of the process can be improved by outputting $\Delta A$, $\Delta B$ and $\Delta C$ from the model 100 of neural network as the optimum modification rate.

Figure 20:
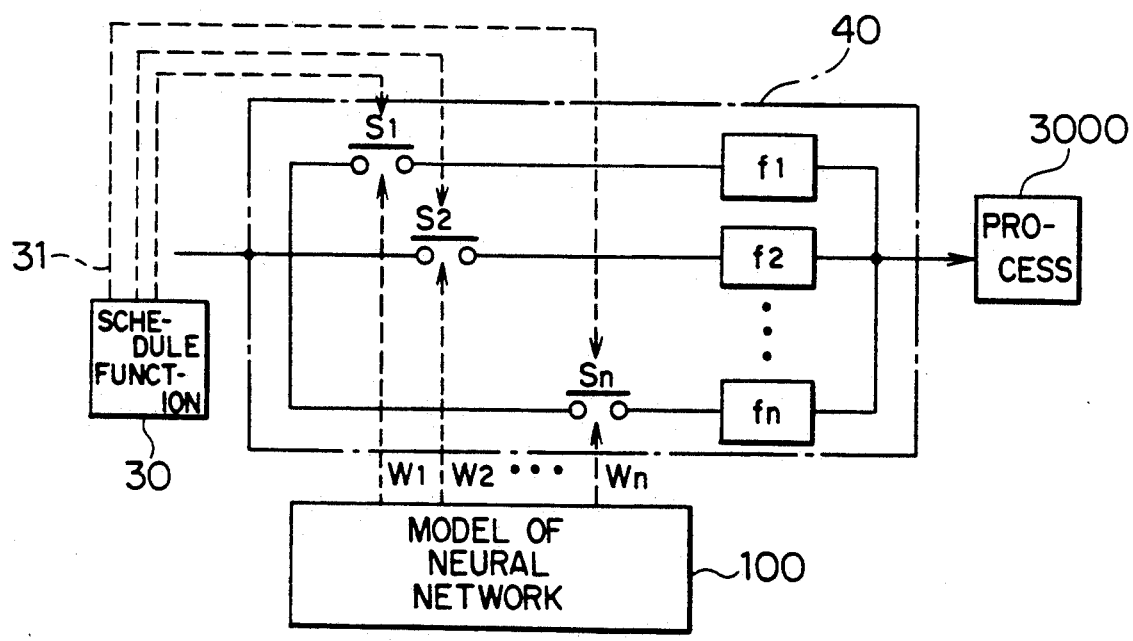
FIG. 20 is a schematic configuration diagram showing the case where the present invention is applied to optimum switching of function.

The case where the present invention is applied to the optimum alternation of a plurality of prepared functions (f) will now be described by referring to FIG. 20. In this case, the response characteristics of the process can be improved by preparing switching functions $S_1$, $S_2$, ---, $S_n$ in the input section or output section of a plurality of functions $f_1$, $f_2$, ---, $f_n$ and outputting manipulating signals $W_1$, $W_2$, ---, $W_n$ from the model 100 of neural network as optimum switching signals in accordance with the operation target 11.

Figure 21:
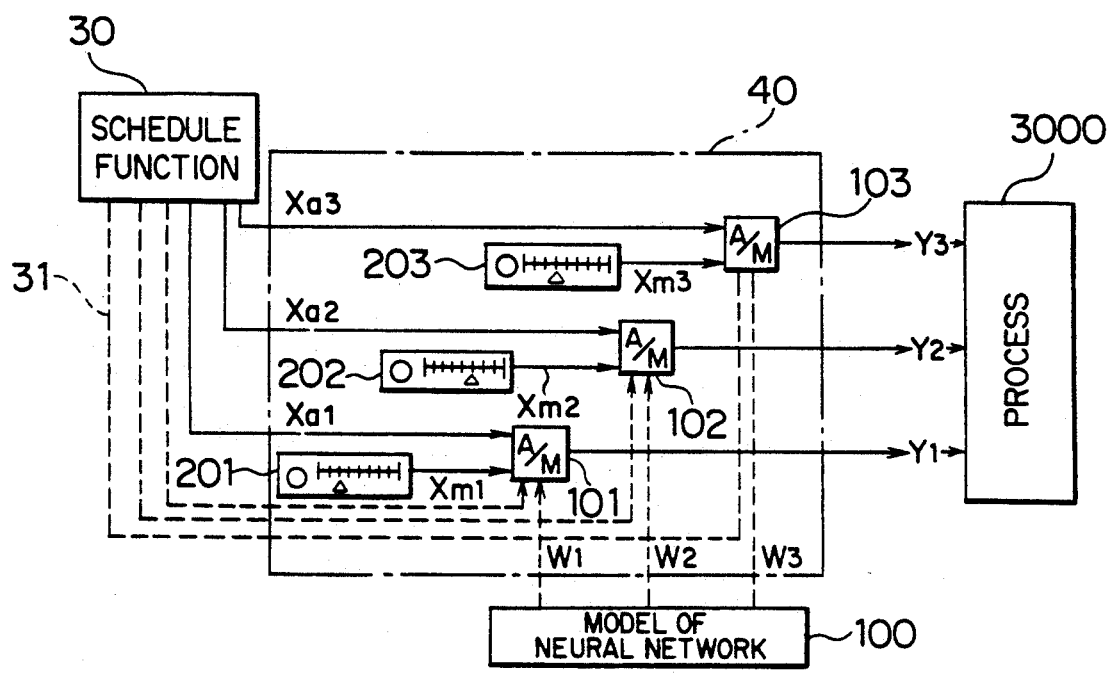
FIG. 21 is a schematic configuration diagram showing the case where the present invention is applied to optimum switching of a manual/automatic switching device.

The case where the present invention is applied to manual/automatic switching will now be decribed by referring to FIG. 21. In case of the automatic mode, input signals $X_{a1}$, $X_{a2}$ and $X_{a3}$ respectively of manual-/automatic switching devices 101, 102 and 103 become outputs $Y_1$, $Y_2$ and $Y_3$, respectively. In case of the manual mode, signals $X_{m1}$, $X_{m2}$ and $X_{m3}$ manually set respectively in manual setting devices 201, 202 and 203 become output signals $Y_1$, $Y_2$ and $Y_3$, respectively. Switching is performed by optimum switching signals $W_1$, $W_2$ and $W_3$ supplied from the model 100 of neural network in accordance with the operation target 11.

Figure 22:
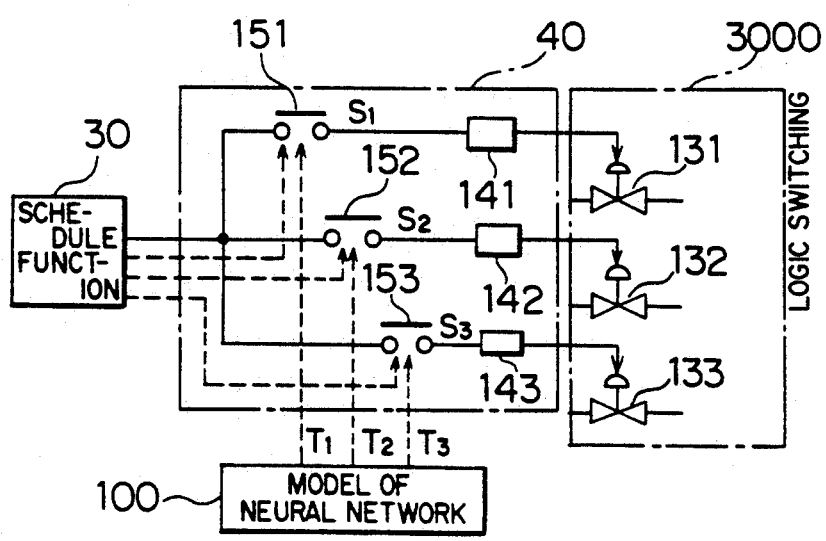
FIG. 22 is a schematic configuration diagram showing the case where the present invention is applied to optimum switching of actuators.

The case where the present invention is applied to actuator switching will now be described by referring to FIG. 22. In order to determine the optimum actuator coupled to the regulating function 40 out of a plurality of actuators 131, 132 and 133 manipulated by actuating devices 141, 142 and 143, optimum switching signals $T_1$, $T_2$ and $T_3$ are outputted from the model 100 of neural network to switching devices 151, 152 and 153, respectively.

Figure 23:
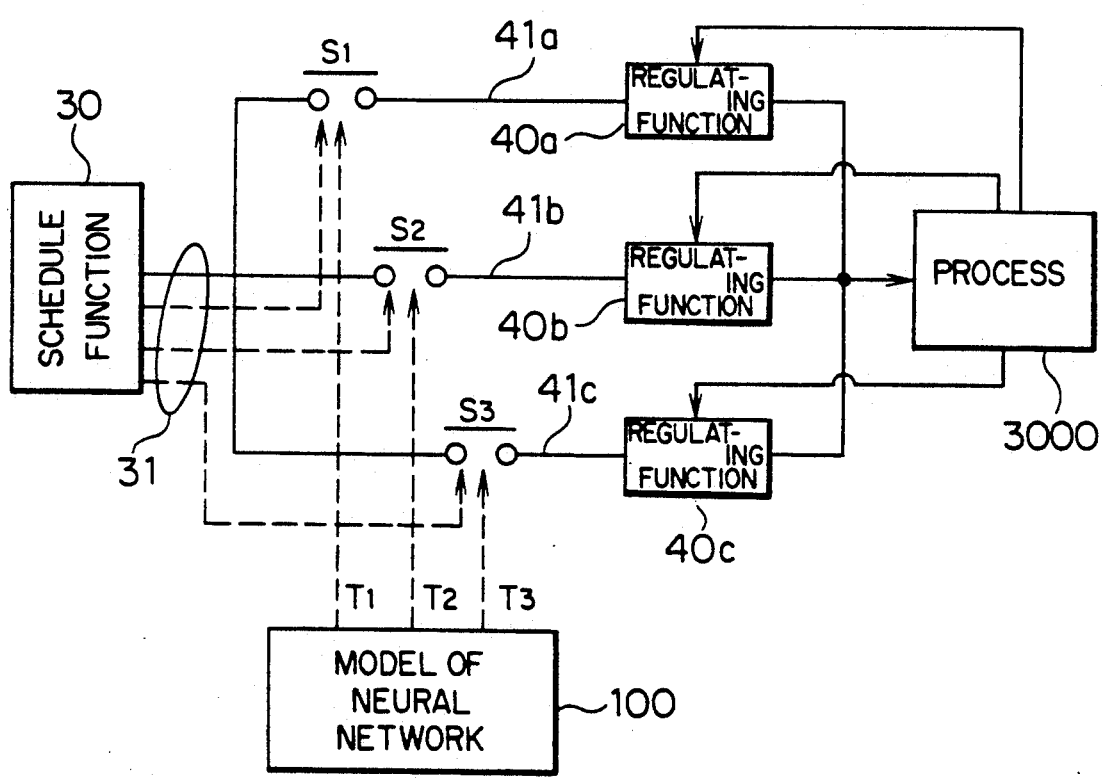
FIG. 23 is a schematic configuration diagram showing the case where the present invention is applied to optimum selection of regulating function.

The case where the present invention is applied to switching of the regulating function itself with respect to the same actuator will now be described by referring to FIG. 23. In this case, it is possible to determine the operation of a plurality of regulating functions 40a, 40b and 40c by outputting optimum switching signals $T_1$, $T_2$ and $T_3$ from the model 100 of neural network to switching devices $S_1$, $S_2$ and $S_3$ disposed in respective input sections.

The case where optimum selection of a specific device or a specific number of devices meeting the operation target out of a plurality of devices is performed for manipulation or operation will now be described by referring to FIG. 24. FIG. 24 shows the case where ten devices 3001, 3002, ---, 3010 are operated as an example. The schedule function 30 generates manipulation or operation command for controllers or manipulation devices 601, 602, ---, 610 of respective devices. However, it is necessary to determine which device is the subject. In this case as well, optimum device selection signals $M_1$, $M_2$, ---, $M_{10}$ outputted from the model 100 of neural network are supplied to a storage section 311 of the schedule function 30 in accordance with the operation target 11. In this case, the optimum device selection signal is given in the form of a bias signal.

Various application examples of the present invention have heretofore been described. These examples can be arbitrarily combined according to the object. The true nature of the present invention is not changed by this.

In embodiments of the present invention, the following effects (a) to (k) are obtained.

(a) As actual operation results are accumulated, operation characteristics are improved in a self-enhancing manner.

That is to say, fuzzy reasoning built in the control system and self-learning mechanism centering around the model of neural network contribute to this. Only qualitative knowledge possessed by experts such as operators, regulators and control engineers is required to add such skilled capability to the control system. Therefore, initial regulation required at the time of operation start of the process can be simplified. Succeeding operation characteristics become better and better.

(b) With respect to the operation target changing every day and every moment, optimum operation of the process is always assured. That is to say, if the model of neural network built in the control system has sufficiently learned the optimum operation method corresponding to past operation cases, optimum operation can always be realized when the operation target is given.

(c) Multi-purpose optimization becomes easy. In operating the process, the operator sets various demands and weights corresponding to them in the control system in accordance with the situation of every day and ever moment. As a result, necessary operation characteristics are obtained. That is to say, the operator need only determine the degree of demands concerning the time required for startup, energy consumption, machine life consumption, time required for target attainment, attainment accuracy of target state, attainment accuracy of state transition rate, resource consumption, margin against operational constraint, and so on. For the present system as calculation control system, therefore, it is not necessary to make complicated large-scale program with extensive time.

(d) It can be used for optimum regulation of PID gain. As a result, extensive time of regulation performed by the regulator becomes unnecessary, and the regulating function can always follow the non-linearity of dynamic characteristics of the process caused by operation condition with optimum gain. Further, even if the characteristics of the process change with time, the optimum gain can always be maintained. Therefore, homogeneous products of good quality can be produced in the process and the yield is also improved.

(e) Weights of variables used for arithmetic operation and logic operation in the schedule function and regulating function can be optimized. Thereby optimum process operation characteristics according to the operation target are obtained. As a result, initial regulation time of operation expressions can be significantly reduced, and dynamic optimum regulation according to the operation target is performed.

(f) Optimum regulation of the function (f) becomes possible. The effect obtained when the process characteristics change with time is similar to the effect obtained in the aforementioned (d). In case the operation target is changed, it is effective in optimization of the preceding control signal and the bias signal.

(g) In case a plurality of prepared functions are used properly according to the operation state of the process and the operation target, optimum automatic switching becomes possible. Therefore, it becomes unnecessary to make complicated logic for switching administration.

(h) Optimum automatic switching of the manual-/automatic switching device becomes possible. In case manual manipulation is required due to occurrence of abnormablity, for example, runaway of remaining automatic system can be prevented. By message output caused by automatic switching, manipulation error of the operator can be prevented. When shift to automatic operation is effected after manual operation, smooth rapid shift is possible. These effects can be obtained. As a result, load of the operator can be lightened, resulting in a significant effect.

(i) Optimum automatic switching of actuators becomes possible. Therefore, a more stable, safe actuator is selected, and an actuator having better response is selected. A more efficient actuator is selected, and the running cost can be reduced. Actuator life consumption can be made uniform, or its planned administration becomes possible. These effects are obtained. Further, it becomes unnecessary to make complicated logic for switching administration.

(j) Optimum automatic switching of regulating function becomes possible. Therefore, it becomes unnecessary to make complicated logic for switching administration.

(k) Automatic selection of a device or a specific number of devices to be operated out of a plurality of devices becomes possible. Therefore, a more stable, safe device is selected, and a device having better response is selected. A more efficient device is selected, and the running cost can be reduced. Device life consumption can be made uniform or its planned administration becomes possible. Thereby, the number of standby devices can be minimized. These effects are obtained. Further, it becomes unnecessary to make complicated logic for switching administration.

We claim:

1. A process control system comprising:

target setting means for setting an operation target of a process to be controlled;

control means for receiving a signal indicating an operation target thus set from said target setting means and for outputting a controlled variable to operate said process;

evaluating means for quantitatively evaluating operation characteristics corresponding to said operation target of said process operated on the basis of a signal indicating the controlled variable supplied from said control means and for deriving an evaluated value thereby;

modification means for extracting an optimum operation process, qualitatively squaring or conforming with the evaluated value derived by said evaluation means, from a modification rule predetermining operation means in qualitative relation between the operation characteristics and the operation target of said process and for determining a modification rate of said control means; and storage means for storing a relation between the modification rate derived by said modification means and said operation target.

2. A process control system comprising:

target setting means for setting an operation target of a process to be controlled;

control means for receiving a signal indicating an operation target thus set from said target setting means and for outputting a controlled variable to operate said process;

storage means for storing a relation between the operation target and a modification rate of said control means on the basis of past operation characteristics;

evaluation means for quantitatively evaluating operation characteristics corresponding to said operation target of said process operated on the basis of a signal indicating the controlled variable supplied from said control means and a signal indicating said relation supplied from said storage means and for deriving an evaluated value thereby; and modification means for extracting an optimum operation process, qualitatively squaring or conforming with the evaluated value derived by said evaluation means, from a modification rule predetermining operation means in qualitative relation between the operation characteristics and the operation target of said process and for determining said modification rate of said control means.

3. A process control system comprising:

target setting means for setting an operation target of a process to be controlled;

control means for receiving a signal indicating an operation target thus set from said target setting means and for outputting a controlled variable to operate said process;

evaluation means for quantitatively evaluating operation characteristics corresponding to said operation target of said process derived on the basis of a signal indicating the controlled variable supplied from said control means and for deriving an evaluated value thereby;

modification means for extracting an optimum operation process, qualitatively squaring or conforming with the evaluated value derived by said evaluation means, from a modification rule predetermining operation means in qualitative relation between the operation characteristics and the operation target of said process and for determining a modification rate of said control means;

storage means for storing relation between the modification rate derived by said modification means and said operation target; and said evaluation means comprising means for quantitatively evaluating operation characteristics of said process actually operated on the basis of the signal supplied from said control means.

4. A process control system comprising:

a target setting section for setting an operation target of a process to be controlled;

a control section for receiving a signal indicating an operation target thus set from said target setting section and for outputting a controlled variable to operate said process; and an optimization section for optimizing the controlled variable of said control section in accordance with operation characteristics corresponding to said operation target of said process operated on the basis of a signal indicating the controlled variable supplied from said control section, said optimization section comprising:

evaluation means for quantitatively evaluating operation characteristics corresponding to said operation target of said process operated on the basis of a signal indicating the controlled variable supplied from said control means;

a modification rule predetermining operation means in qualitative relation between the operation characteristics and the operation target of said process;

modification means for extracting an optimum operation process, qualitatively squaring or conforming with the evaluated value derived by said evaluation means, from said modification rule and for determining a modification rate of said control section; and storage means for storing relation between the modification rate derived by said modification means and said operation target.

5. A process control system according to claim 4, wherein said storage means comprises a model of a neural network for storing the relation between said operation target and said modification rate as a connection state within a circuit.

6. A process control system according to claim 5, wherein said model of neural network comprises a model of a neural network of backpropagation type having a layer network comprising an input layer, a hidden layer and an output layer.

7. A process control system according to claim 4, wherein said modification means extracts an optimum operation process, qualitatively squaring or conforming with the evaluated value derived by said evaluation means, from said modification rule, converts the operation process thus extracted into a quantitative operation process in accordance with fuzzy logic, and determines said modification rate.

8. A process control system according to claim 4, wherein said evaluation means comprises margin calculation means for quantitatively deriving margin of operation characteristics of said process against operational constraint.

9. A process control system according to claim 4, wherein said modification rule has at least two items comprising a condition part and a conclusion part.

10. A process control system according to claim 4, wherein said control means or control section comprises:
- basic operation schedule producing means for producing an operation schedule allowing said process to attain the operation target; and
- regulating means for modifying said operation schedule on the basis of a signal indicating said relation supplied from said storage means.

11. A process control system comprising:
- target setting means for setting an operation target of a process to be controlled;
- basis operation schedule producing means for producing an operation schedule allowing said process to attain the operation target given by said target setting means;
- storage means for storing relation between a modification rate of the operation schedule and the operation target on the basis of past operation characteristics;
- regulating means for receiving a signal indicating said relation from said storage means and for modifying said basic operation schedule;
- evaluation means for quantitatively evaluating operation characteristics corresponding to said operation target of said process operated on the basis of a signal indicating a modified basic operation schedule supplied from said regulating means;
- modification means for extracting an optimum operation process, qualitatively squaring or conforming with the evaluated value derived by said evaluation means, from a modification rule predetermining operation means in qualitative relation between the operation characteristics and the operation target of said process and for determining a modification rate of said basic operation schedule; and
- said storage means storing the relation between the modification rate derived by said modification means and said operation target as said relation.

12. A process control system comprising:
- target setting means for setting an operation target of a process to be controlled;
- basic operation schedule producing means for producing an operation schedule allowing said process to attain the operation target given by said target setting means;
- regulating means for receiving a signal indicating said operation schedule from said basis operation schedule producing means and for modifying at least one of a manipulation rate and manipulation rate of the manipulating parameter;
- evaluation means for quantitatively evaluating operation characteristics corresponding to said operation target of said process on the basis of a signal indicating said manipulating value supplied from said regulating means;
- modification means for extracting an optimum operation process, qualitatively squaring or conforming with the evaluated value derived by said evaluation means, from a modification rule predetermining operation means in qualitative relation between the operation characteristics and the operation target of said process and for determining a modification rate of at least one of the manipulating parameter and manipulation rate of said manipulating parameter of said regulating means; and
- said storage means storing the relation between the modification rate derived by said modification means and said operation target.

13. A process control system comprising:
- target setting means for setting an operation target of a process to be controlled;
- basic operation schedule producing means for producing an operation schedule allowing said process to attain the operation target given by said target setting means;
- storage means for storing a relation between a modification rate of the operation schedule and the operation target on the basis of past operation characteristics;
- a path for transmitting a signal indicating said relation for operation schedule modification from said storage means to said basic operation schedule producing means;
- evaluation means for quantitatively evaluating operation characteristics corresponding to said operation target of said process operated on the basis of a signal indicating an operation schedule modified on the basis of said signal for operation schedule modification and supplied from said basic operation schedule producing means and for deriving an evaluated value thereby;
- modification means for extracting an optimum operation process, qualitatively squaring or conforming with the evaluated value derived by said evaluation means, from a modification rule predetermining operation means in qualitative relation between the operation characteristics and the operation target of said process and for determining the modification rate of said basic operation schedule; and
- said storage means storing the relation between the modification rate derived by said modification means and said operation target.

14. A process control system comprising:
- target setting means for setting an operation target of a process to be controlled;
- control means for receiving a signal indicating an operation target from said target setting means and for outputting a controlled variable to operate said process;
- evaluation means for quantitatively evaluating operation characteristics corresponding to said operation target of said process operated on the basis of a signal indicating the controlled variable supplied from said control means and for deriving an evaluated value thereby;
- modification means for extracting an optimum operation process, qualitatively squaring or conforming with the evaluated value derived by said evaluation means, from a modification rule predetermining operation means in qualitative relation between the operation characteristics and the operation target of said process and for determining a modification rate of said control means;
- storage means having a model of neural network for storing a relation between said operation target and the modification rate derived by said modification means as a connection state within a circuit; and
- learning means for making said model of neural network learn the relation between said operation target and said modification rate.

15. A process control system according to claim 14, wherein said model of neural network comprises a model of neural network of backpropagation type having a layer network comprising an input layer, a hidden layer and an output layer, and said learning means determines the circuit connection state so that a predetermined modification rate can be outputted when the operation target is inputted to said model of neural network.

16. A process control system comprising:
target setting means for setting an operation target of a process to be controlled;
control means for receiving a signal indicating an operation target from said target setting means and for outputting a controlled variable to operate said process;
a model of a neural network for storing a relation between the operation target and an optimum operation process stored beforehand on the basis of past operation characteristics; and
regulating means for regulating the controlled variable of said control means on the basis of an output signal appearing in an output section of said model of neural network in response to an input signal corresponding to said operation target supplied to an input section of said model of neural network.

17. A process control system comprising:
target setting means for setting a plurality of operation targets of a process to be controlled;
control means for receiving a signal indicating an operation target from said target setting means and for outputting a controlled variable to operate said process;
a model of a neural network storing relations between the operation targets and an optimum operation process stored beforehand as connection states within a circuit; and
regulating means for regulating the controlled variable of said control means on the basis of an output signal appearing in an output section in response to input signals corresponding to a plurality of said operation targets supplied to an input section of said model of a neural network.

18. A process control system for power plant, said power plant comprising:
a boiler for generating steam by using heat generated by combustion of fuel;
a steam turbine for converting heat energy of generated steam into mechanical energy; and
a generator for converting said mechanical energy resulting from conversion into electrical energy;
said process control system comprising:
target setting means for setting an operation target of said process;
control means for receiving a signal indicating an operation target from said target setting means and for outputting a controlled variable to operate said process;
evaluation means for quantitatively evaluating operation characteristics corresponding to said operation target of said process operated on the basis of a signal indicating the controlled variable supplied from said control means and for deriving an evaluated value thereby;
modification means for extracting an optimum operation process, qualitatively squaring or conforming with the evaluated value derived by said evaluation means, from a modification rule predetermining operation means in qualitative relation between the operation characteristics and the operation target of said process and for determining a modification rate of said control means; and
storage means for storing a relation between the modification rate derived by said modification means and said operation target.

19. A process control system for power plant, said power plant comprising:
a boiler for generating steam by using heat generated by combustion of fuel;
a steam turbine for converting heat energy of generated steam into mechanical energy; and
a generator for converting said mechanical energy resulting from conversion into electrical energy,
said process control system comprising:
target setting means for setting an operation target of said process;
control means for receiving a signal indicating an operation target from said target setting means and for outputting a controlled variable to operate said process;
storage means for storing a relation between the operation target and a modification rate of said control means on the basis of past operation characteristics;
evaluation means for quantitatively evaluating operation characteristics corresponding to said operation target of said process operated on the basis of a signal indicating the controlled variable supplied from said control means and a signal indicating said relation supplied from said storage means; and
modification means for extracting an optimum operation process, qualitatively squaring or conforming with the evaluated value derived by said evaluation means, from a modification rule predetermining operation means in qualitative relation between the operation characteristics and the operation target of said process and for determining a modification rate of said control means.

20. A process control system for power plant, said power plant comprising:
a boiler for generating steam by using heat generated by combustion of fuel;
a steam turbine for converting heat energy of generated steam into mechanical energy; and
a generator for converting said mechanical energy resulting from conversion into electrical energy;
said process control system comprising:
target setting means for setting an operation target of said process;
basis operation schedule producing means for receiving a signal indicating the operation target supplied from said target setting means and for producing an operation schedule;
evaluation means for quantitatively evaluating operation characteristics of said process operated along said basic operation schedule;
modification means for extracting an optimum operation process, qualitatively squaring or conforming with the evaluated value, from a modification rule predetermining operation means in qualitative relation between operation characteristics and corresponding operation target of said process and for determining a modification rate of the operation schedule;
storage means for storing a relation between the modification rate derived by said modification means and said operation target; and regulating means for regulating the operation schedule of said process in response to a signal indicating said relation supplied from said storage means.

21. A process control system comprising:

a fuzzy reasoning unit for determining a desired operational value based on at least one process response characteristics and a fuzzy rule, and outputting said desired operational value;

a neural network for receiving said desired operational value from said fuzzy reasoning unit as learning data, learning and storing said desired operational value, and outputting modification values for modifying parameters for controlling a process based on an operation target and said desired operational value;

a modification unit for receiving said modification values from said neural network, and modifying said parameters based on said modification values; and a control unit for controlling said process based on said modified parameters.

22. A process control method comprising the steps of:

determining a desired operational value based on at least one process response characteristic and a fuzzy rule;

inputting said desired operational value to a neural network as learning data;

learning and storing said desired operational value with said neural network;

obtaining modification values for modifying parameters for controlling a process based on an operation target and said desired operational parameter with said neural network;

modifying said parameters based on said modification values; and controlling said process based on said modified parameters.

* * * * *